(12) United States Patent
Reisner-Kollmann et al.

(10) Patent No.: US 9,996,974 B2
(45) Date of Patent: Jun. 12, 2018

(54) METHOD AND APPARATUS FOR REPRESENTING A PHYSICAL SCENE

(71) Applicant: QUALCOMM Incorporated, San Diego, CA (US)

(72) Inventors: Irene Reisner-Kollmann, Vienna (AT); Istvan Siklossy, Vienna (AT); Qi Pan, Vienna (AT); Michael Gervautz, Vienna (AT); Andrew Gee, Vienna (AT)

(73) Assignee: QUALCOMM Incorporated, San Diego, CA (US)

( * ) Notice: Subject to any disclaimer, the term of this patent is extended or adjusted under 35 U.S.C. 154(b) by 310 days.

(21) Appl. No.: 14/472,278

(22) Filed: Aug. 28, 2014

(65) Prior Publication Data

US 2015/0062120 A1 Mar. 5, 2015

Related U.S. Application Data

(60) Provisional application No. 61/872,376, filed on Aug. 30, 2013, provisional application No. 61/872,152, (Continued)

(51) Int. Cl.
*G06T 15/00* (2011.01)
*G06T 19/00* (2011.01)
*G06T 17/00* (2006.01)

(52) U.S. Cl.
CPC ............ *G06T 19/006* (2013.01); *G06T 17/00* (2013.01)

(58) Field of Classification Search
CPC ... G06T 19/006; G06T 15/60; G06T 2215/16; G06T 7/60; G06T 15/50; G06T 17/00;
(Continued)

(56) References Cited

U.S. PATENT DOCUMENTS 8,311,275 B1 * 11/2012 Berlic ................ G06K 9/00771
348/143
8,436,872 B2 5/2013 Wright et al.
(Continued)

FOREIGN PATENT DOCUMENTS

| CN | 102681661 A | 9/2012 |
| CN | 102681811 A | 9/2012 |
| WO | 2013048260 A2 | 4/2013 |

OTHER PUBLICATIONS

Bohg, J., et al., "Mind the gap—Robotic Grasping under Incomplete Observation", 2011 IEEE International Conference on Robotics and Automation, May 9-13, 2011, Shanghai, China, pp. 686-693.
(Continued)

*Primary Examiner* — Xilin Guo
(74) *Attorney, Agent, or Firm* — Kilpatrick Townsend & Stockton

(57) ABSTRACT

Systems, methods, and devices are described for constructing a digital representation of a physical scene by obtaining information about the physical scene. Based on the information, an initial portion of a planar surface within the physical scene may be identified. In one aspect of the disclosure, constructing a digital representation of a physical scene may include obtaining information about the physical scene, identifying a planar surface within the physical scene, selecting a physical object within the physical scene, placed above the planar surface, detecting properties associated with the physical object, generating a three-dimensional (3D) reconstructed object using the properties associated with the physical object, and representing the planar surface as an augmented reality (AR) plane in an augmented reality environment, wherein the AR plane in the AR environment is capable of supporting 3D reconstructed objects on top of it.

31 Claims, 20 Drawing Sheets

Related U.S. Application Data filed on Aug. 30, 2013, provisional application No. 61/872,426, filed on Aug. 30, 2013.

(58) Field of Classification Search
CPC ..... G06T 7/70; G06T 2219/024; G06T 17/05; G06T 19/20; G06T 11/60; G06T 2200/04; G06T 15/08; G06T 2207/10028; G06T 15/205; G06T 2207/10016; G06T 2207/30204; G02B 27/0172; G06F 3/013; G06F 1/163; G06F 17/50; G06F 2217/06; G09G 5/377; G09G 5/003; G09G 2320/028; G01J 1/1626; H04N 13/0459; H04N 13/0018; G06K 9/3233
See application file for complete search history.

(56) References Cited

U.S. PATENT DOCUMENTS

| | | | |
|---|---|---|---|
| 2003/0071194 A1* | 4/2003 | Mueller | G01B 11/00 250/208.1 |
| 2010/0289817 A1 | 11/2010 | Meier et al. | |
| 2012/0229508 A1* | 9/2012 | Wigdor | G06F 3/147 345/633 |
| 2012/0249741 A1 | 10/2012 | Maciocci et al. | |
| 2013/0044128 A1 | 2/2013 | Liu et al. | |
| 2013/0141419 A1* | 6/2013 | Mount | G06F 3/011 345/419 |
| 2013/0147798 A1* | 6/2013 | Karsch | G06T 19/006 345/420 |
| 2013/0182012 A1 | 7/2013 | Kim et al. | |
| 2013/0336581 A1* | 12/2013 | Datta | G06K 9/00785 382/165 |
| 2014/0002491 A1* | 1/2014 | Lamb | G06F 1/163 345/633 |
| 2014/0118397 A1* | 5/2014 | Lee | G06T 7/0057 345/633 |
| 2014/0233804 A1* | 8/2014 | Gustavsson | E21B 47/0002 382/103 |

OTHER PUBLICATIONS

Marton, Zoltan-Csaba et al., "General 3D Modelling of Novel Objects from a Single View", 2010 IEEE/RSJ International Conference on Intelligent Robots and Systems, Oct. 18-22, 2010, Taipei, Taiwan, pp. 3700-3705.

Marton, Zoltan-Csaba, et al., "Reconstruction and Verification of 3D Object Models for Grasping", Robotics Research, The 14th International Symposium ISRR, Jan. 1, 2011, pp. 315-328, Retrieved from the Internet: URL:http://rd.springer.com/chapter/10.1007/978-3-642-19457-3_19.

Partial International Search Report—PCT/US2014/053581—ISA/EPO—dated Dec. 15, 2012.

Xu, K., et al., "Constraint-based Automatic Placement for Scene Composition", Proceedings Graphics Interface 2002, May 27-29, 2002, pp. 25-34.

International Search Report and Written Opinion—PCT/US2014/053581—ISA/EPO—dated May 11, 2015.

Kaushik, R., et al., "Fast Planar Clustering and Polygon Extraction from Noisy Range Images Acquired in Indoor Environments", Proceedings of the 2011 IEEE International Conference on Mechatronics and Automation, Aug. 4, 2010, pp. 483-488.

Nevatia, R, "Depth Measurement by Motion Stereo", Computer Graphics and Image Processing, vol. 5, No. 2, Jun. 1976 (Jun. 1976), pp. 203-214.

Shearman, S, "VW creates Augmented Reality Golf Match", Marketing Magazine, Aug. 27, 2010 (Aug. 27, 2010), 6 pages, Retrieved from the Internet: URL:http://www.marketingmagazine.co.uk/article/1024710/vw-creates-augmented-reality-golf-match.

Xiao, J., et al., "Fast Plane Detection for SLAM from Noisy Range Images in Both Structured and Unstructured Environments", Proceedings of the 2011 IEEE International Conference on Mechatronics and Automation, Aug. 7, 2011, pp. 1768-1773.

\* cited by examiner

METHOD AND APPARATUS FOR REPRESENTING A PHYSICAL SCENE

CROSS REFERENCE SECTION

This application is a non-provisional application and claims the benefit of priority of U.S. Provisional Application No. 61/872,376 titled "Method and Apparatus for Representing a Plane with Objects on Top" and filed on Aug. 30, 2013, U.S. Provisional Application No. 61/872,152 titled "Navigational Meshes with Three-Dimensional Reconstruction or Location and Mapping Techniques, including SLAM and VSLAM," and filed on Aug. 30, 2013, and U.S. Provisional Application No. 61/872,426 titled "Generation of Representations of Objects Lying on a Planar Surface," and filed on Aug. 30, 2013, which are herein incorporated by reference in their entirety for all purposes.

TECHNICAL FIELD

The present disclosures generally relate to augmented reality environments, and more specifically, machine-based recognition of real-world surroundings.

BACKGROUND

In augmented reality (AR) environments, a user may view an integration of artificial or virtual graphics with the user's natural surroundings. In some early implementations of AR, a user may see graphics displayed arbitrarily amongst or within the user's natural surroundings via, for example, augmented reality goggles. For instance, a graphic of a random butterfly may fly along the view of the AR goggles while the user continues to view his or her natural surroundings, regardless of whether the butterfly has any relevance to anything the user is seeing naturally. In more sophisticated implementations of AR, a user may be able to apply AR features or graphics directly to objects or structures of the user's natural surroundings. For example, the user may want to direct the graphic of the butterfly to land on a wall or a table, which requires first that the AR environment recognize where in fact the wall or table actually resides in the user's field of view.

In other cases, robots or other automated machines may apply similar concepts and techniques in the AR field when attempting to orient themselves in natural surroundings. For example, a robot may require an understanding of where there are walls and tables in the surrounding environment, so that the robot does not run into the walls or tables. In other cases, the robot may interact with the natural surroundings by, for example, identifying a cup on a table and picking up the cup. Performing such a task may first require the robot to successfully identify the cup, and in some cases, the table that the cup is on. However, achieving machine-based recognition of natural surroundings in real time has proven to be a difficult problem to solve, as existing techniques may not be fast enough or energy efficient enough for real-time purposes, for example. Thus, there is a need in the art for improved methods of machine-based recognition of natural surroundings in a real-time setting.

SUMMARY

The present disclosures generally relate to augmented reality environments, and more specifically, machine-based recognition of real-world surroundings.

Systems, methods, and devices are described for constructing a digital representation of a physical scene by obtaining information about the physical scene. Based on the information, an initial portion of a planar surface within the physical scene may be identified. In certain aspects, a physical object from the physical scene may be selected and reconstructed as a three-dimensional (3D) reconstructed object. The planar surface may be represented as an augmented reality (AR) plane in an augmented reality environment, wherein the AR plane in the AR environment is capable of supporting 3D reconstructed objects on top of it.

In certain aspects, additional portions of the planar surface may also be identified based on the at least one captured image. Each of the additional portions is identified as being a part of the planar surface based on determining a likeness between at least one visual property associated with the additional portion with at least one corresponding visual property associated with one or more portions already identified to be part of the planar surface.

An example method for constructing a digital representation of a physical scene may include obtaining information about the physical scene, identifying a planar surface within the physical scene, selecting a physical object within the physical scene, placed above the planar surface, detecting properties associated with the physical object, generating a three-dimensional (3D) reconstructed object using the properties associated with the physical object, and representing the planar surface as an augmented reality (AR) plane in an augmented reality environment, wherein the AR plane in the AR environment is capable of supporting 3D reconstructed objects on top of it.

In certain aspects of the method, identifying the physical object for selection may include identifying one or more regions in the planar surface, wherein the one or more regions correspond to location of the physical object on the planar surface, wherein the obtained information comprises one or more feature points of the physical object, wherein each feature point is indicative of a location, relative to the planar surface, of a point on an external surface of the physical object and identifying one or more external surfaces of the physical object based on location of one or more convex regions and the one or more feature points.

In certain aspects of the method, representing the planar surface as the AR plane may include analyzing at least two images of the physical scene comprising the physical object and based upon analysis of the at least two images of the physical scene, creating the AR plane such that the AR plane corresponds to the physical scene and excludes at least one region corresponding to the physical object. The created AR plane may include a plurality of cells, each cell of the plurality of cells representing a region in the physical scene that is free of the physical object.

In certain aspects, analyzing the at least two images of the physical scene may include capturing, using a camera, a first image of the physical scene at a first location, wherein the first image includes the physical object, determining a distance that the camera has moved from the first location to a second location, capturing, using the camera, a second image of the physical scene at the second location, wherein the second image includes the physical object, and determining depth information for the physical object using the first image and the second image.

In certain aspects of the method, generating the 3D reconstructed object may include obtaining one or more feature points of the physical object, wherein each feature point of the one or more feature points is indicative of a location, relative to the planar surface, of a point on an external surface of the physical object, estimating, using information associated with the planar surface and the one or more feature points, a shape of a portion of the physical object that is not visible, and constructing the 3D reconstructed object, based on the estimation. In certain instances, the estimation comprises transforming the information and the one or more feature points to a fronto-parallel perspective of the planar surface. In some instances, the estimation comprises at least one of a spline representation, a reflected symmetrical object representation, a planar representation, or a curved representation.

In certain aspects of the disclosure, constructing the digital representation of the physical object may include extruding object in a direction normal to the planar surface, based on a shape of a portion of the planar surface occluded by the physical object.

In certain aspects of the method, representing the planar surface as the AR plane may include identifying an initial portion of the planar surface within the physical scene, identifying additional portions of the planar surface, wherein each of the additional portions is identified as being a part of the planar surface based on determining a likeness between at least one visual or geometric property associated with the additional portions with at least one corresponding visual or geometric property associated with one or more portions already identified to be part of the planar surface.

In certain implementations, identifying the additional portions of the planar surface may include establishing a model of a planar region within which the planar surface resides, partitioning the planar region into a plurality of cells; and evaluating each cell as a potential additional portion of the planar surface. Evaluating each cell may include iterating steps of for each cell identified as an additional portion of the planar surface, identifying neighboring cells not already identified as part of the planar surface, and for each identified neighboring cell, evaluating the neighboring cell as a potential portion of the planar surface.

An example device for constructing a digital representation of a physical scene may include a memory, a camera for obtaining information about the physical scene, and a processor coupled to the memory. The processor may be configured for identifying a planar surface within the physical scene, selecting a physical object within the physical scene, placed above the planar surface, detecting properties associated with the physical object, generating a three-dimensional (3D) reconstructed object using the properties associated with the physical object, and representing the planar surface as an augmented reality (AR) plane in an augmented reality environment, wherein the AR plane in the AR environment is capable of supporting 3D reconstructed objects on top of it.

In certain aspects of the device, identifying the physical object for selection may include identifying one or more regions in the planar surface, wherein the one or more regions correspond to location of the physical object on the planar surface, wherein the obtained information comprises one or more feature points of the physical object, wherein each feature point is indicative of a location, relative to the planar surface, of a point on an external surface of the physical object and identifying one or more external surfaces of the physical object based on location of one or more convex regions and the one or more feature points.

In certain aspects of the device, representing the planar surface as the AR plane may include analyzing at least two images of the physical scene comprising the physical object and based upon analysis of the at least two images of the physical scene, creating the AR plane such that the AR plane corresponds to the physical scene and excludes at least one region corresponding to the physical object. The created AR plane may include a plurality of cells, each cell of the plurality of cells representing a region in the physical scene that is free of the physical object.

In certain aspects, analyzing the at least two images of the physical scene may include capturing, using a camera, a first image of the physical scene at a first location, wherein the first image includes the physical object, determining a distance that the camera has moved from the first location to a second location, capturing, using the camera, a second image of the physical scene at the second location, wherein the second image includes the physical object, and determining depth information for the physical object using the first image and the second image.

In certain aspects of the device, generating the 3D reconstructed object may include obtaining one or more feature points of the physical object, wherein each feature point of the one or more feature points is indicative of a location, relative to the planar surface, of a point on an external surface of the physical object, estimating, using information associated with the planar surface and the one or more feature points, a shape of a portion of the physical object that is not visible, and constructing the 3D reconstructed object, based on the estimation. In certain instances, the estimation comprises transforming the information and the one or more feature points to a fronto-parallel perspective of the planar surface. In some instances, the estimation comprises at least one of a spline representation, a reflected symmetrical object representation, a planar representation, or a curved representation.

In certain aspects of the disclosure, constructing the digital representation of the physical object may include extruding object in a direction normal to the planar surface, based on a shape of a portion of the planar surface occluded by the physical object.

In certain aspects of the device, representing the planar surface as the AR plane may include identifying an initial portion of the planar surface within the physical scene, identifying additional portions of the planar surface, wherein each of the additional portions is identified as being a part of the planar surface based on determining a likeness between at least one visual or geometric property associated with the additional portions with at least one corresponding visual or geometric property associated with one or more portions already identified to be part of the planar surface.

In certain implementations, identifying the additional portions of the planar surface may include establishing a model of a planar region within which the planar surface resides, partitioning the planar region into a plurality of cells; and evaluating each cell as a potential additional portion of the planar surface. Evaluating each cell may include iterating steps of for each cell identified as an additional portion of the planar surface, identifying neighboring cells not already identified as part of the planar surface, and for each identified neighboring cell, evaluating the neighboring cell as a potential portion of the planar surface.

An example non-transitory computer-readable storage medium, wherein the non-transitory computer-readable storage medium comprises instructions executable by a processor, the instructions comprising instructions for identifying a planar surface within the physical scene, selecting a physical object within the physical scene, placed above the planar surface, detecting properties associated with the physical object, generating a three-dimensional (3D) reconstructed object using the properties associated with the physical object, and representing the planar surface as an augmented reality (AR) plane in an augmented reality environment, wherein the AR plane in the AR environment is capable of supporting 3D reconstructed objects on top of it.

In certain aspects of the non-transitory computer-readable storage medium, generating the 3D reconstructed object may include instructions for obtaining one or more feature points of the physical object, wherein each feature point of the one or more feature points is indicative of a location, relative to the planar surface, of a point on an external surface of the physical object, estimating, using information associated with the planar surface and the one or more feature points, a shape of a portion of the physical object that is not visible, and constructing the 3D reconstructed object, based on the estimation. In certain instances, the estimation comprises transforming the information and the one or more feature points to a fronto-parallel perspective of the planar surface. In some instances, the estimation comprises at least one of a spline representation, a reflected symmetrical object representation, a planar representation, or a curved representation.

In certain examples of the non-transitory computer-readable storage medium, the AR plane may include a plurality of cells, each cell of the plurality of cells representing a region in the physical scene that is free of the physical object. In certain aspects, representing the planar surface as the AR plane comprises the processor further include analyze at least two images of the physical scene comprising the physical object, and based upon analysis of the at least two images of the physical scene, create the AR plane such that the AR plane corresponds to the physical scene and excludes at least one region corresponding to the physical object.

An example apparatus for constructing a digital representation of a physical scene may include means for obtaining information about the physical scene, means for identifying a planar surface within the physical scene, means for selecting a physical object within the physical scene, placed above the planar surface, means for detecting properties associated with the physical object, means for generating a three-dimensional (3D) reconstructed object using the properties associated with the physical object, and means for representing the planar surface as an augmented reality (AR) plane in an augmented reality environment, wherein the AR plane in the AR environment is capable of supporting 3D reconstructed objects on top of it.

In certain aspects of the example apparatus, generating the 3D reconstructed object may include means for obtaining one or more feature points of the physical object, wherein each feature point of the one or more feature points is indicative of a location, relative to the planar surface, of a point on an external surface of the physical object, means for estimating, using information associated with the planar surface and the one or more feature points, a shape of a portion of the physical object that is not visible, and means for constructing the 3D reconstructed object, based on the estimation. In certain instances, the estimation comprises means for transforming the information and the one or more feature points to a fronto-parallel perspective of the planar surface. In some instances, the estimation comprises at least one of a spline representation, a reflected symmetrical object representation, a planar representation, or a curved representation.

In certain examples of the example apparatus, the AR plane may include a plurality of cells, each cell of the plurality of cells representing a region in the physical scene that is free of the physical object. In certain aspects, representing the planar surface as the AR plane include means for analyzing at least two images of the physical scene comprising the physical object, and based upon analysis of the at least two images of the physical scene, means for creating the AR plane such that the AR plane corresponds to the physical scene and excludes at least one region corresponding to the physical object.

The foregoing has outlined rather broadly features and technical advantages of examples in order that the detailed description that follows can be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages, will be better understood from the following description when considered in connection with the accompanying figures. Each of the figures is provided for the purpose of illustration and description only and not as a definition of the limits of the claims.

BRIEF DESCRIPTION OF THE DRAWINGS

An understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
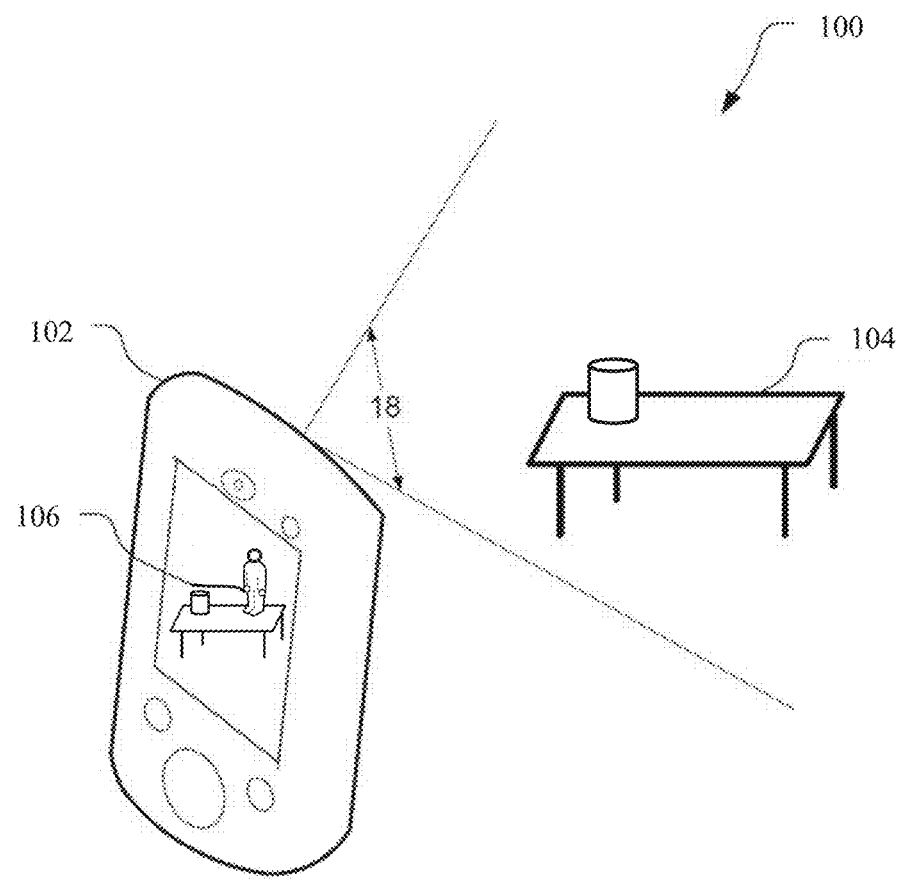
FIG. 1 illustrates an example setting for using a computing device in an Augmented Reality (AR) system, in accordance with certain embodiments of the present disclosure.

The word "exemplary" is used herein to mean "serving as an example, instance, or illustration." Any embodiment or design described herein as "exemplary" is not necessarily to be construed as preferred or advantageous over other embodiments or designs.

Methods and apparatuses are presented for recognizing flat surfaces, and any objects on said flat surfaces, in an augmented reality (AR) environment, based on a user's natural surroundings.

Building an AR application based on an unknown real-world scene may be challenging because it is not known in advance, which scene and which type of objects will be reconstructed at runtime. For example, it is not known in advance if the user is entering a room or going outside in a natural environment. Therefore, it may be very difficult to create a sophisticated augmented reality application based on any type of scene.

Generally, it may be possible to use a generic representation of a scene, such as one large triangle mesh for the whole scene. In some instances, this may be reasonable if someone wants to render the reconstructed scene. However, it may be desirable to not only render the reconstructed scene but also interact with the rendered scene with various real and virtual objects. More complicated use cases such as growing a virtual plant around a real-world object may be achievable by segmenting the reconstructed scene into parts. Embodiments described herein enable reconstructing generic scenes into meaningful reconstructed components that correlate to individual surfaces and objects with varying properties.

Certain embodiments of the present disclosure may represent an unknown real-world scene as an augmented reality (AR) plane with multiple objects on top of it. The proposed representation may be used for most of the typical scenarios for indoor AR applications such as a table-top or a floor. The proposed representation may also be used for outdoor AR applications.

By representing and reconstructing scenes, according to embodiments described, a meaningful segmentation may be performed for an AR plane representing a ground plane (e.g., table/floor) and individual objects may be represented on top the AR plane. For certain embodiments the represented objects may be used for individual augmentations and replacement of real-world objects form the physical scene in the AR environment. For example, the color of the real-world object may be augmented with a different color or the real-word object may be completely replaced with a virtual object. In addition, a sophisticated game play may be generated based on multiple objects.

The AR plane as proposed herein may have boundaries that correspond to the real edges of the physical surface (e.g., edges of a table). Using the proposed representation, a developer may render the AR plane with a specific appearance (e.g., let grass grow on the ground plane).

Certain embodiments may be able to indicate if the surrounding surface of boundaries of the reconstructed plane is pointing upwards or downwards. For example, this information may be used to let an object fall off a table. However, when the object reaches boundaries of a floor surface (e.g., reaches a wall), the boundary may stop the fall of the object.

In certain embodiments, to analyze a physical environment, a simultaneous localization and mapping (SLAM) process may be used. A SLAM process may include a first two-dimensional image of a physical environment being captured using a camera. The two-dimensional image may lack depth information. The camera may then be moved a distance. This distance (and direction) may be measured. A second image may be captured of the physical environment. By using the travelled distance and direction, the depth of multiple identified reference points in the two images that are determined to match may be calculated. Implementations of a SLAM process may use many more images to refine the determined locations of reference points and to identify additional reference points in the physical environment. In addition to the use of SLAM, some other form of three-dimensional mapping process may be used, such as by capturing images that include depth information, for example using time-of-flight analysis or a stereoscopic camera system. As described herein, although the SLAM process may be used for illustration purposes, other techniques may be used instead of SLAM without deviating from the scope of the invention.

In some embodiments, a point cloud can be created to detect or further refine the AR plane or the object placed on the AR plane. The point cloud may include multiple reference points, with each reference point having a depth value. A reference point may refer to a representation of a point in a three-dimensional coordinate system, such as a Cartesian coordinate system comprising x, y and z, with reference to a given origin. As detailed herein, the point cloud obtained using a SLAM process or other three-dimensional mapping processes create the AR plane. In one embodiment, the AR plane may be created such that physical objects with which a virtual object may collide are excluded from the AR plane. In another embodiment, the AR plane may represent a planar region in which no physical objects are present and on which virtual objects can be positioned and moved in an AR environment without regard to possible collision with a physical object.

An AR plane may define a plane that is composed of multiple cells, such as polygonal cells. Each polygonal cell may represent a convex planar region where a virtual object can be positioned without colliding with another object (such as the user's view of a physical object). As an example, referring to a three-dimensional first-person shooter game, an AR plane may define the regions where virtual characters are permitted to move. For instance, objects, walls, and cliffs may be excluded from the AR plane. Once an AR plane has been created, virtual objects may be permitted to move to any position on the AR plane. Since the AR plane has been created to exclude regions corresponding to physical objects, as long as virtual objects are positioned on the AR plane, it is known that the virtual object will not impermissibly intersect or pass through a user's view of a physical object in the AR environment (which would negatively impact the AR environment's realism).

In certain embodiments, a navigational mesh or a "navmesh" derived in an AR system may also be considered as an AR plane. In some instances, the AR plane may also be referred to as a navigational mesh or navmesh, while describing a AR system. In some instances, terms such as an AR plane, navigational mesh or navmesh, may be used interchangeably while describing an AR environment, without deviating from the scope of the invention.

Referring to FIG. 1, an example AR system 100 is illustrated. In certain embodiments, the AR system 100 may be configured to perform a SLAM process. System 100 includes a computing device 102, such as a mobile device. The mobile device may be any portable computing device with an input sensory unit, such as a camera, and a display. Here, the computing device 102 may be a mobile device, such as a smart phone, although the functionality described herein is not limited to smart phones. For example, the computing device 102 may be any portable or mobile device such as a digital camera, a camcorder, a tablet computer, a personal digital assistant, a video game console, a head-mounted display (HMD) or other wearable display, a projector device, or other device. Further, instead of the mobile device, a computing device 102 such as a personal computer (e.g., desktop computer), or other non-hand-held device or device not typically labeled a mobile device, could be used. The computing device 102 may include a camera for capturing images of physical objects in the real-world physical environment. In the illustrated embodiment, a cylinder (e.g., can of soup) is present on a table 104.

The computing device 102 may be configured to augment reality by capturing images of the physical environment, here capturing images of the table on which the can of soup is situated, and displaying the additional imagery on a transparent or semi-transparent display supplemented with one or more virtual objects. In FIG. 1, a three-dimensional character 106 is superimposed on the view of the physical environment, including table 104. Three-dimensional character 106 may be any form of virtual object and is not restricted to a humanoid character. Three-dimensional character 106 may be permitted to move to various locations on an AR plane that has been constructed on the surface of table 104 as detailed herein. In certain embodiments, the AR plane may be constructed such that the can of soup is excluded from the AR plane, thus precluding three-dimensional character 106 from appearing to collide with the can of soup in the AR environment presented on the display of computing device 102.

Figure 2:
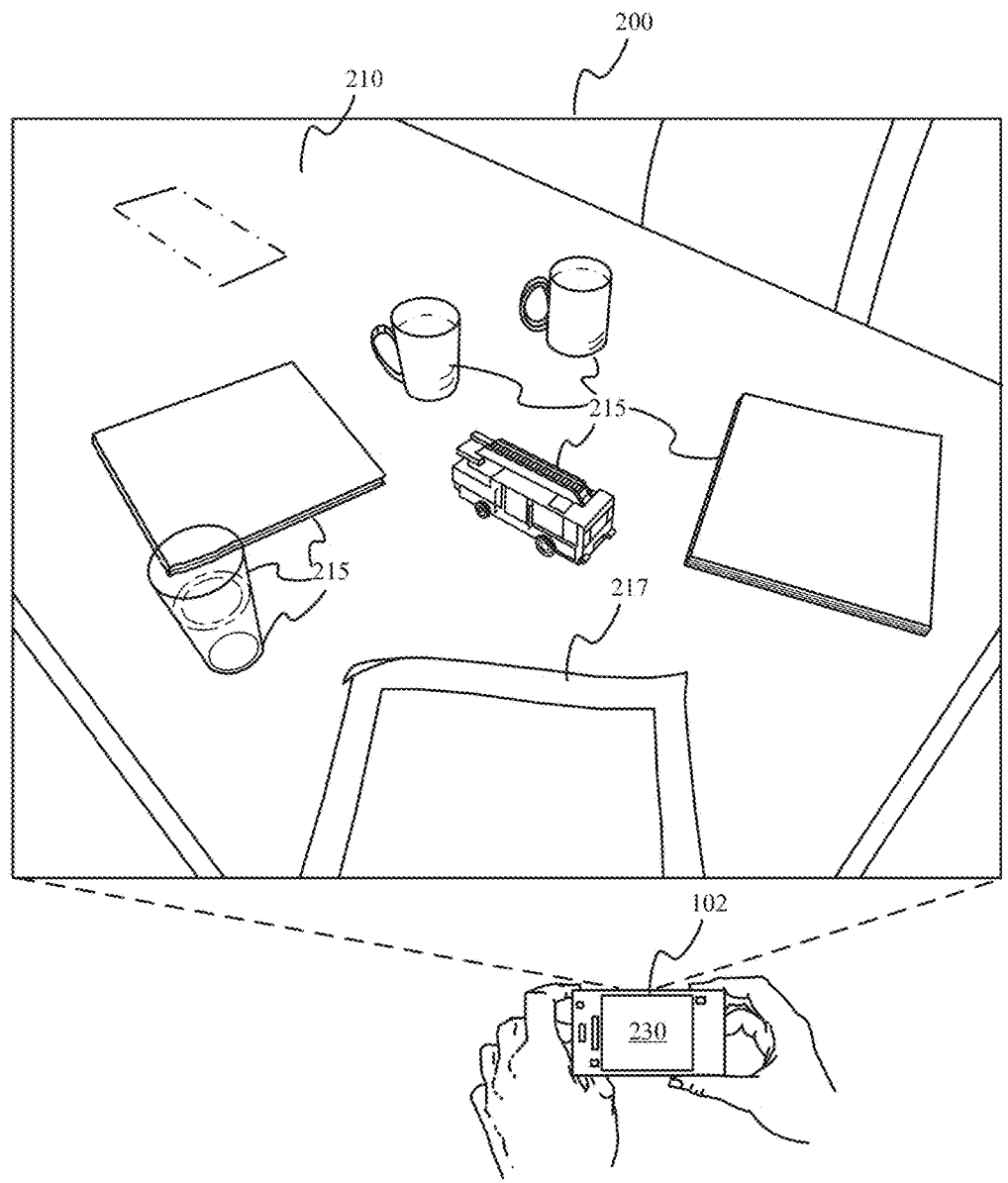
FIG. 2 illustrates an example physical scene, in accordance with certain embodiments of the present disclosure.

FIG. 2 illustrates an example physical scene 200, in accordance with certain embodiments of the present disclosure. As illustrated, the scene may include part of a table 210 (e.g., a flat surface). In addition, some physical objects 215 (e.g., books, cups, toys, etc.) are positioned on the top of the table 210. In some images, shadows and reflections may also be visible on the table 210. In some embodiments, the computing device 102 can capture one or more images and/or other data for feature point (e.g., SLAM) determination. The one or more images may be shown in real-time or near real-time on a display 230 of the computing device 102. Moreover, the display 230 may also show AR graphics and/or other information overlaid on the one or more displayed images. The computing device 102 can comprise a tablet, smart phone, personal camera, and the like, and the one or more images may be images from a video feed captured by a camera of the computing device 102.

Techniques can be performed by an application, such as an AR application, executed by the computing device 102 to determine the location, orientation, and dimensions of the planar surface using, for example, image processing and/or feature point information, and generate an augmented reality (AR) plane, that may be a reconstructed representation of the planar surface. These techniques may further utilize image target 217, which can be an object with features known to the computing device 102, to help determine the features of the planar surface.

Figure 3:
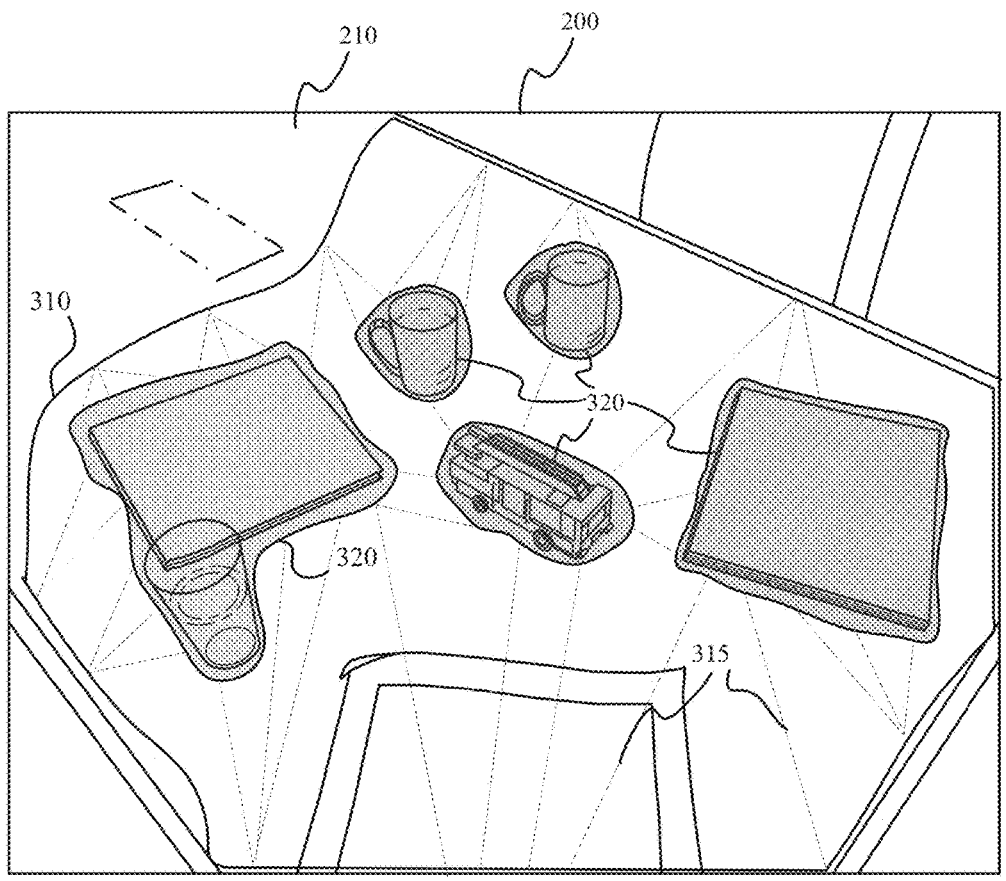
FIG. 3 illustrates an example planar surface that represents a portion of the physical scene illustrated in FIG. 2.

FIG. 3 illustrates an example AR plane 310 that represents a portion of the physical scene illustrated in FIG. 2. As illustrated, a table 210 (e.g., a flat surface) is identified in the scene. The triangular mesh 315 represents the planar surface that is identified by the proposed method.

The boundaries (or borders) of the represented AR plane 310 may grow over time by analyzing more portions (e.g., cells) and adding them to the identified portion of the planar surface. This usually happens when more areas of the planar surface become visible due to a new viewpoint. In FIG. 3, the borders of the representation of the AR plane 310 do not yet correctly indicate all of the physical borders of the planar surface 210. However, depending on the algorithm utilized, the representation can continue to be improved and refined with the availability of additional information (e.g., images at different angles). In this example, lines 315 are shown to help illustrate the AR plane 310. It can be noted that the AR plane 310 includes a large number of lines 315, although only two are labeled.

Figure 15A:
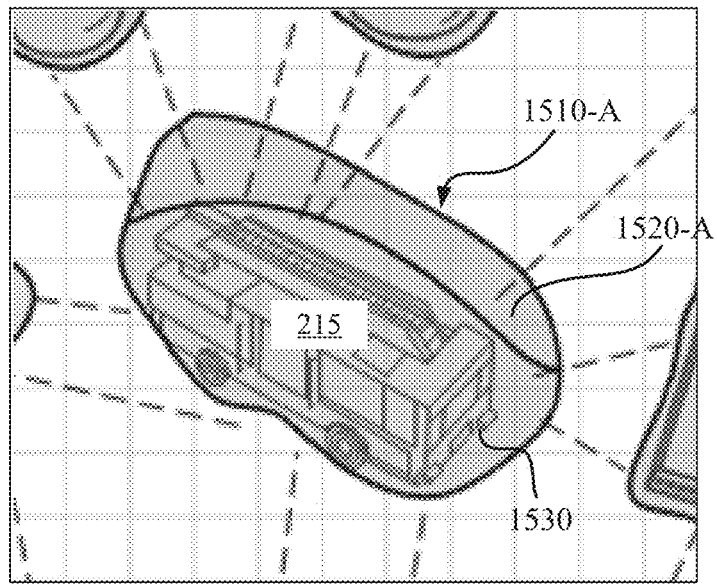
FIGS. 15A and 15B, respectfully illustrate a hole created by an object on a planar surface, and a modified hole used to generate a digital representation of the object.

The AR plane 310 can not only indicate where borders of a planar surface 210 may be, but also can include "holes" 320 where portions of the planar surface 210 are occluded. For object-detection purposes, these holes 320 can indicate the presence of objects 215. The holes 320 cast by an objects 215 (e.g. due to plane sweeping, plane extension using statistical information) is likely larger than the actual objects 215 due to occlusion. In other words, unless the planar surface 210 is viewed fronto-parallel (i.e., from directly overhead), the objects 215 will occlude some portion of the planar surface 210 behind the object. FIG. 15A helps illustrate this phenomenon in further detail.

Figure 4:
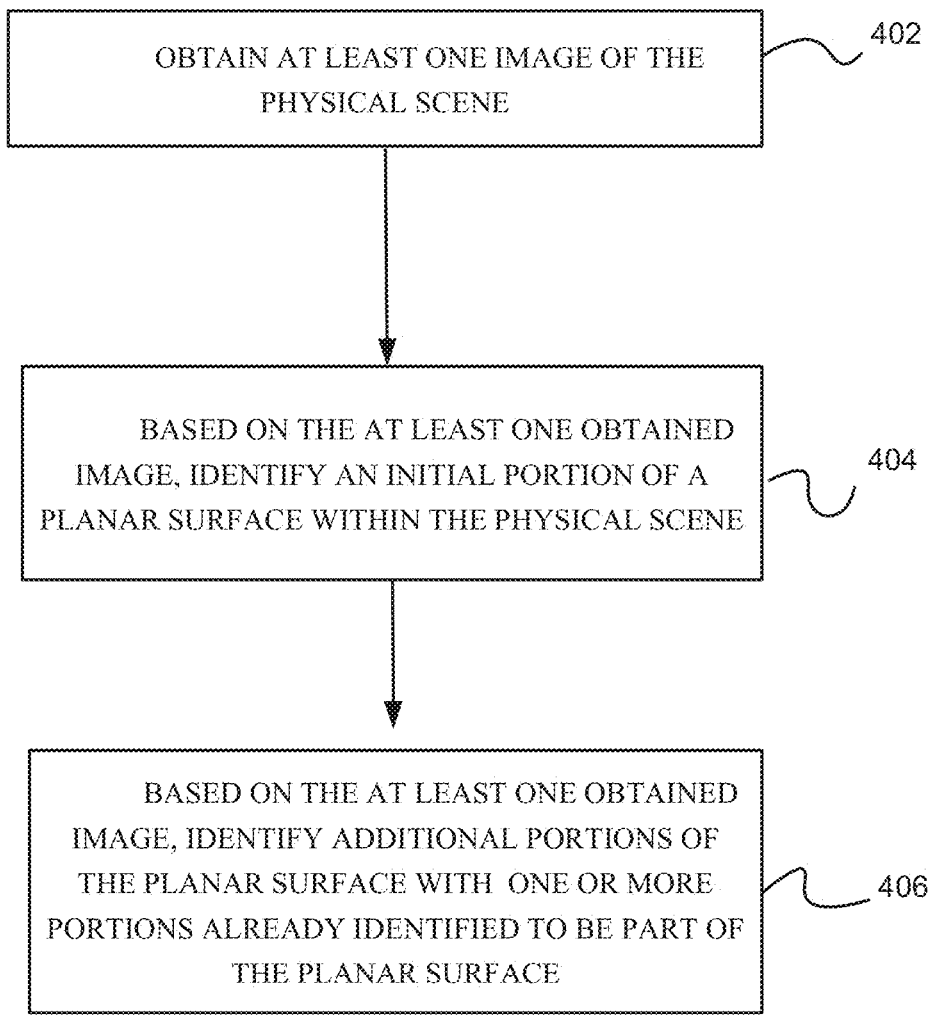
FIG. 4 illustrates a flow diagram with example operations that may be performed by a computing device for generating a digital representation of a physical scene, in accordance with certain aspects of the present disclosure.

FIG. 4 is a flow diagram for a method to be performed by a computing device for creating a digital representation of a physical scene, in accordance with certain embodiments of the present disclosure. According to one or more aspects, any and/or all of the methods and/or method steps described herein may be implemented by and/or in a computing device 102, such as the mobile device and/or the device described in greater detail in FIG. 20, for instance. In one embodiment, one or more of the operations described below with respect to FIG. 4 are implemented by a processor of the computing device 2000, such as the processor 2010 or another processor. Additionally or alternatively, any and/or all of the methods and/or method steps described herein may be implemented in computer-readable instructions, such as computer-readable instructions stored on a computer-readable medium such as the memory 2020, storage or another computer-readable medium.

At block 402, the computing device may obtain at least one image of the physical scene. For example, the device may have a camera to capture one or more images. Alternatively, the device may receive an image that is taken from the scene. At 404, based on the at least one image, the device may identify an initial portion of a planar surface within the physical scene. For example, the device may identify an object that is used as an initialization target (e.g., a 2-dimensional surface such as a piece of paper with a known graphic printed thereon, a cylinder, or any other object that is known in advance). Although, an initialization target is discussed herein, other techniques may be used for detecting the initial portion of the planer surface without deviating from the scope of the invention. For example, one or more objects placed on a surface may be detected using feature detection for the objects. In scenarios where the base of one or more objects are coplanar with a portion of a surface, that portion of the surface may be indicate an initial portion of a planar surface.

In certain embodiments, the use of an initialization object (e.g., object 217 in FIG. 2) provides a way for the system to quickly establish the position of the plane in question. Example of an initialization object is illustrated by object 217 in FIG. 2. Useful assumptions may be made regarding the plane using the initialization object. For example, for horizontal planes, one assumption may be that the plane is perpendicular to the direction of gravity. It should be noted that if an initialization target is part of the scene, a direct relationship between the camera and the plane can be deduced without the need to assume direction of gravity. On the other hand, if the plane is estimated without initialization target, some assumptions such as direction of gravity may be used, since there might be other dominant planes in the scene (e.g., walls).

Another assumption may be that, since the initialization object is resting on the surface, the bottom surface of the initialization object is co-planar with the plane. Based on assumptions such as these, a model of the plane may be constructed and position of camera relative to the plane may be found.

Once an initial model for the initial portion of the AR plane is constructed, a planar surface corresponding to the real world object (e.g., a table) that the initialization object is resting on may be found. In this example, it is known that the table is co-planar with the AR plane that has been constructed. What is not known is how far the table extends in different directions within the model of the plane, in other words, where are the edges of the table. The techniques described herein describe how to successively identify additional portions of a planar surface (e.g., table) and provide an efficient way of determining the actual extent of such a model of the planar surface using one or more visual images.

In addition, height information about one or more points in the physical scene (e.g., point clouds) may be used in the system to get a better estimate of the planar surface and the objects that are on top of it. A point cloud is a set of data points that can be represented in a coordinate system. For example, in a three-dimensional coordinate system, these points can be defined by X, Y, and Z coordinates. Point clouds often are intended to represent the external surface of an object. In one embodiment, one or more point clouds may be generated as an output of a SLAM (Simultaneous localization and mapping) system. Alternatively, the point clouds may be generated by a depth sensor (e.g., that could be part of a camera).

At block 406, based on the at least one obtained image, the device may identify additional portions of the planar surface. In one embodiment, each of the additional portions is identified as being a part of the planar surface based on determining a likeness between at least one visual or geometric property associated with the additional portion with at least one corresponding visual property associated with one or more portions already identified to be part of the planar surface.

According to one embodiment of the invention, the visual property used may be a set of red-green-blue (RGB) values, which may be a better indication of whether a portion in question is in fact a part of a larger planar surface (e.g., a table). The RGB value (e.g., the table top is a particular hue of purple) may be more effective as a visual property than, say, brightness values of pixels, which may merely indicate different lighting conditions such as shadows or reflections, as opposed to an actual border of a planar surface.

In one embodiment, the additional portions of the planar surface may be identified by establishing an AR planar region within which the planar surface resides. The AR planar region may be partitioned into a plurality of cells. Each cell may be evaluated as a potential additional portion of the planar surface.

In one embodiment, the cells may be evaluated iteratively. For example, for each cell that is identified as an additional portion of the planar surface, neighboring cells are identified. In one embodiment, for each neighboring cell that is not already identified as part of the planar surface, the cell may be evaluated as a potential portion of the planar surface. If the neighboring cell has similar characteristics as the characteristics of other cells in the planar surface, the cell may be added to the AR plane. If the neighboring cell does not have similar characteristics, the cell may be identified as not being part of the AR plane. The iterative process can be repeated until no more new, additional portions of the planar surface can be found, or some other termination condition is reached.

There can be different ways of evaluating the "likeness" of a candidate cell or how "similar" the candidate cell is, as compare to cells already identified as part of the planar surface. For example, the at least one visual property of all the cells already identified as part of the planar surface may be averaged or combined in some other way to establish a baseline. Alternatively, the at least one visual property of just some of the cells (e.g., only cells in proximity) may be used to establish the baseline. The at least one visual property of the candidate cell may be evaluated to determine a measure of "likeness" to the baseline. If the measure of likeness is above a pre-determined threshold, the candidate cell may be identified as being a part of the AR plane. Otherwise, the candidate cell may be identified as not being a part of the AR plane.

In one embodiment, the computing device 102 may obtain a plurality of images and improve the planar representation by using information in the images. For example, the computing device 102 may move from one location to another location and capture one or more images of the scene from different angles. The computing device 102 may dynamically update/improve the planar representation over time by using information from newer images. In one embodiment, the planar representation of the scene may be generated in real-time as the user moves in an area.

Figure 20:
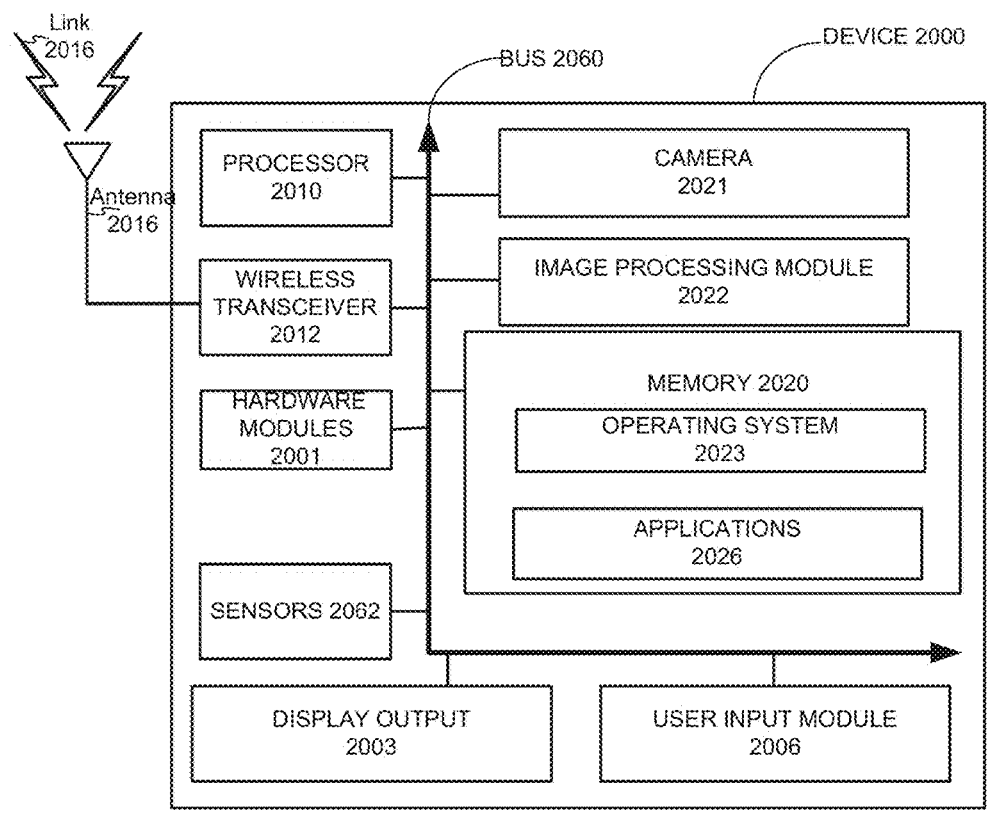
FIG. 20 describes one potential implementation of a computing device which may be used to represent planar surfaces, according to certain aspects of the present disclosure.

In one embodiment, the proposed method may be used to process images that are taken using a camera, similar to the camera 2021 discussed in FIG. 20. In another embodiment, the images may be taken with depth cameras (e.g., cameras which include a depth sensor) and be processed to generate the planar representation. In general, any kind of cameras or image sensor may be used in the proposed system without departing from teachings herein.

Generally, a depth sensor provides a range image where each pixel represents the distance to the camera. The pixels can be easily converted to a three dimensional (3-D) point cloud. Multiple range images can be combined for covering a larger part of a 3-D space. If information about position and orientation of a plane is available (note that the boundaries can be unknown) 3-D points that are located in the plane can be identified. The 3-D points can be projected onto the plane and thus be further investigated only in the 2-D space of the plane.

Figure 5A:
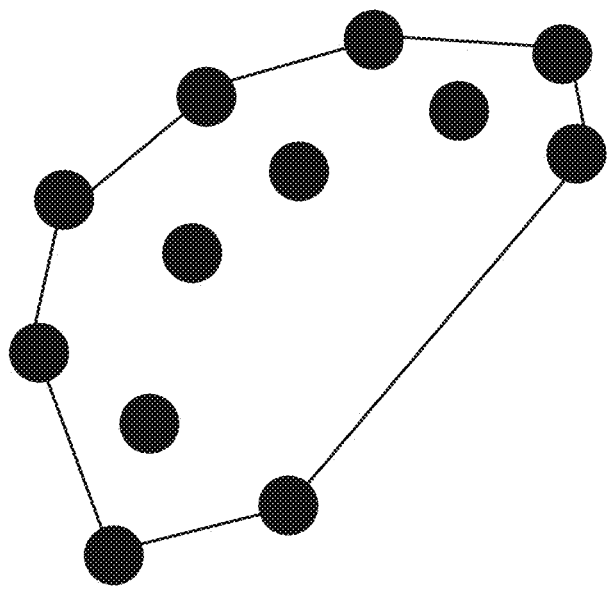
FIGS. 5A and 5B illustrate a convex hull and a refined hull, in accordance with certain aspects of the present disclosure.
Figure 5B:
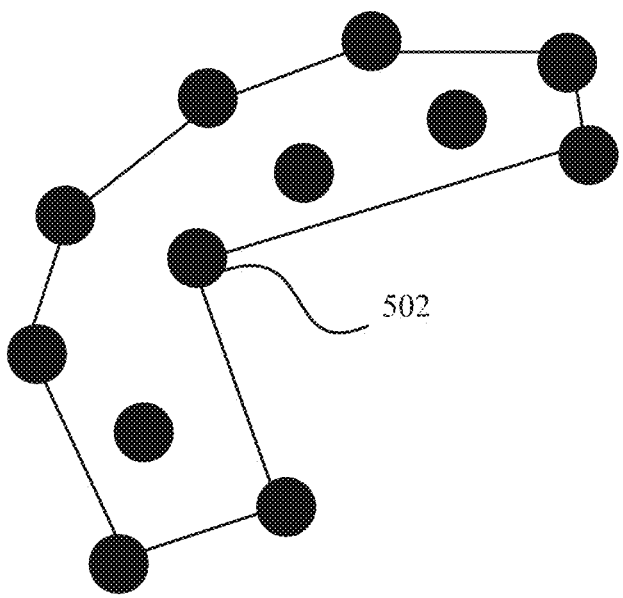

Referring to FIGS. 5A and 5B, in order to find the outer boundaries of a plane using the points inside the plane, a convex hull (as illustrated in FIG. 5A) may be calculated. In mathematics, the convex hull or convex envelope of a set X of points in the Euclidean plane or Euclidean space is the smallest convex set that contains X. For instance, when X is a bounded subset of the plane, the convex hull may be visualized as the shape formed by a rubber band stretched around X. In one embodiment, for constructing a more complex shape, the convex hull may further be refined (as illustrated by FIG. 5B) by adding additional points to the boundary. For example, in FIG. 5B, the convex hull is further refined by adding point 502 to the shape. The boundary may iteratively be refined in areas where a large empty space is enclosed by the boundary.

In one embodiment, based on nearby 3-D points to the plane boundaries, it is possible to find out whether the surrounding surface of a boundary is below or above the plane. The boundaries can be labeled accordingly as upwards or downwards.

Figure 6:
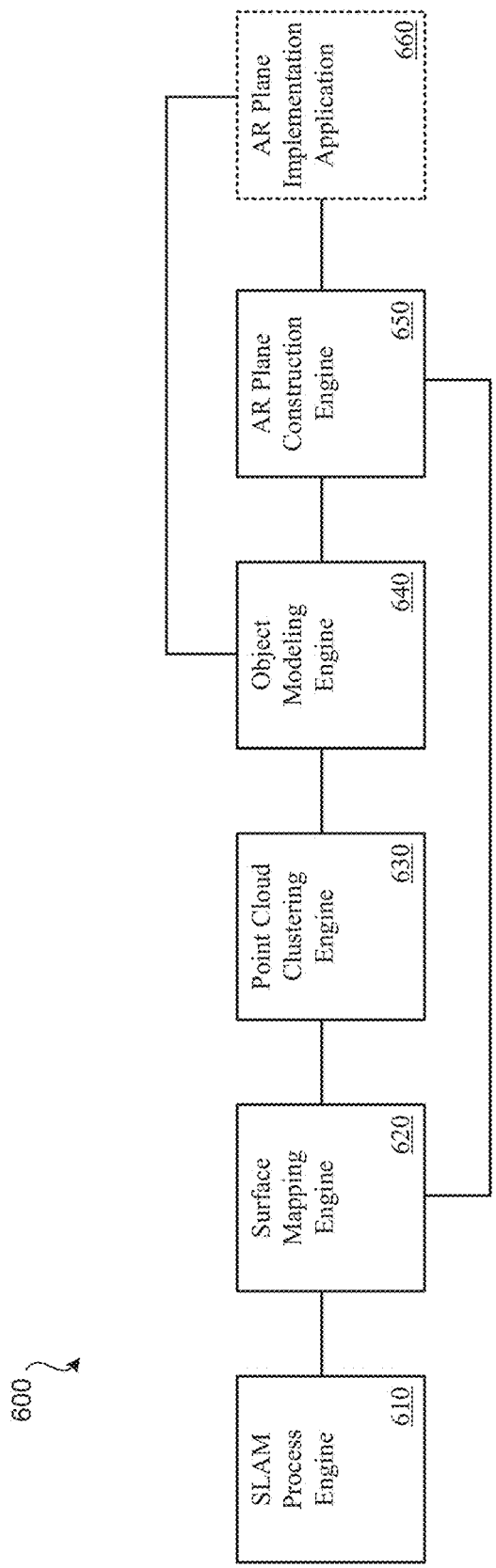
FIG. 6 illustrates a block diagram with example for modules configured to construct an AR plane.

FIG. 6 illustrates an embodiment of a system 600 that may be used to construct a AR plane. In some embodiments, a navigational mesh or a "navmesh" derived in an Augmented Reality system may also be referred to as an AR plane. In some instances, the AR plane may also be referred to as a navigational mesh or navmesh while describing a Augmented Reality system. System 600 may be implemented using the system of FIG. 20 or some other computerized system. Each module of system 600 may be implemented using software, firmware, and/or hardware. For instance, one or more general purpose processors 2010 and/or specialized processors may perform the functions of some or all of the modules of system 600.

SLAM process engine 610 may be configured to use a SLAM process to create a point cloud of reference points based on physical objects present in images of a physical environment captured by a camera. SLAM process engine 610 may cause capturing of an image and may identify various reference points within that image. A second image may be caused to be captured by SLAM process engine 610. The second image may be captured from a different location than the first image. The direction and/or distance between capture of the first and second image may be determined by SLAM process engine 610, by determining the relative positioning of the camera at the time of obtaining the first and second image and a reference point common amongst the two images. For example, at least some of the same reference points within the first image may be identified within the second image. Using a triangulation-based process, SLAM process engine 610 may determine the depth of at least some of the corresponding reference points present within the first and second images. Multiple additional images may be captured, have reference points identified, and depth values calculated for the physical environment. Therefore, the SLAM process may involve the use of more than two images and may calculate and refine three-dimensional positions for various reference points throughout the physical environment. SLAM process engine 610 may output a point cloud that includes multiple points, each having three-dimensional coordinates (that is, including a depth value). Each of these points may correspond to a reference point present in each of the at least two images captured using the camera (or other form of image capture device). As an alternate to SLAM process engine 610, some other form of three dimensional mapping process may be used to create a point cloud. For example, images that include depth information, for example images captured using a time-of-flight analysis or a stereoscopic camera system, may be used to generate a point cloud for the physical environment.

Figure 7:
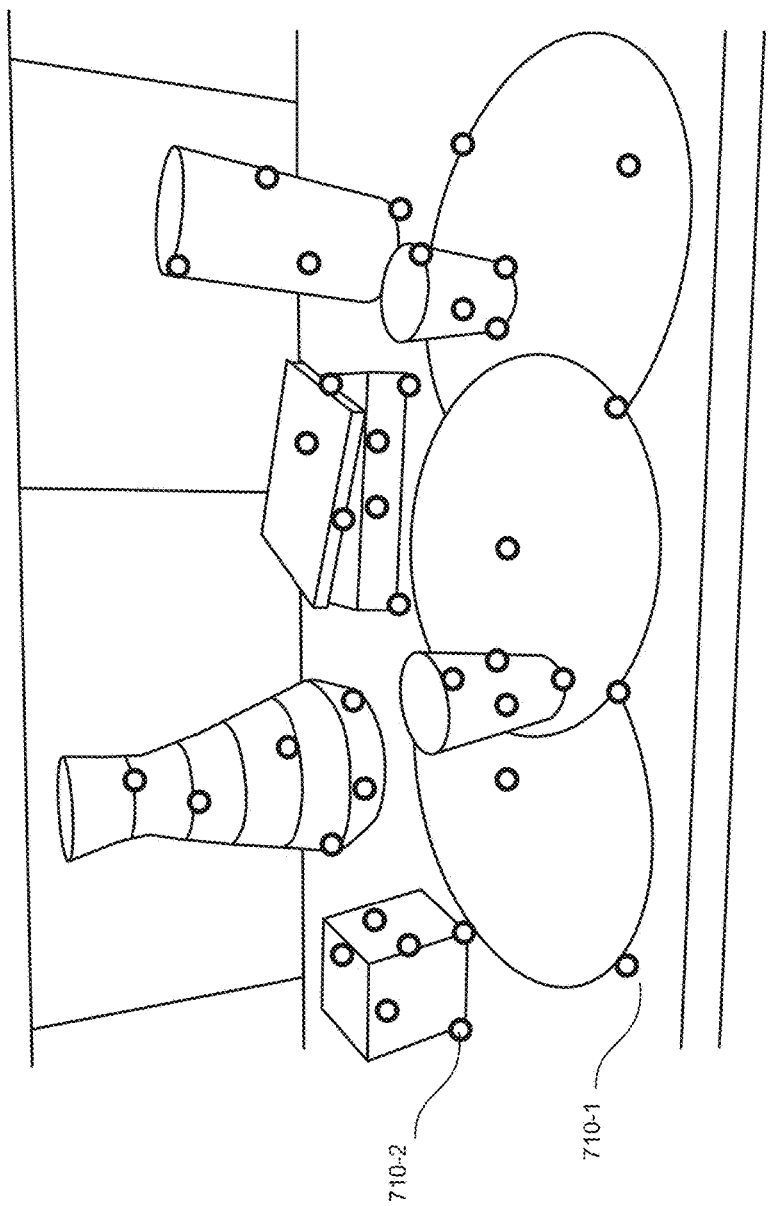
FIG. 7 illustrates an example of a point cloud obtained according to aspects of the disclosure and superimposed on the corresponding physical environment.

FIG. 7 represents an example of a captured image identifying various reference points as part of a point cloud. SLAM process engine 610 that may identify various reference points. Each point illustrated in FIG. 7 may represent a reference point for which a depth value was calculated by SLAM process engine 610 based on at least two analyzed images. For example, reference point 710-1 corresponds to the edge of the placemat on the table and reference point 710-2 corresponds to an edge of the facial tissue box. Each of these points may have a depth value.

While SLAM process engine 610 may be used to determine the point cloud (such as the point cloud of FIG. 7), other arrangements may be employed. For instance, a camera capable of measuring depth, such as a stereo camera system or time-of-flight camera system may be used in place of (or to augment) SLAM process engine 610. SLAM process engine 610 may allow for determining depth information without additional hardware being needed besides conventional hardware of the computing device 102, including a conventional two-dimensional camera and movement-sensing hardware, such as a gyroscope and/or accelerometer. In one instance, the gyroscope and/or the accelerometer may further aid in determining the change in distance/orientation of the camera with respect to the physical scene (or object in the scene).

Figure 8:
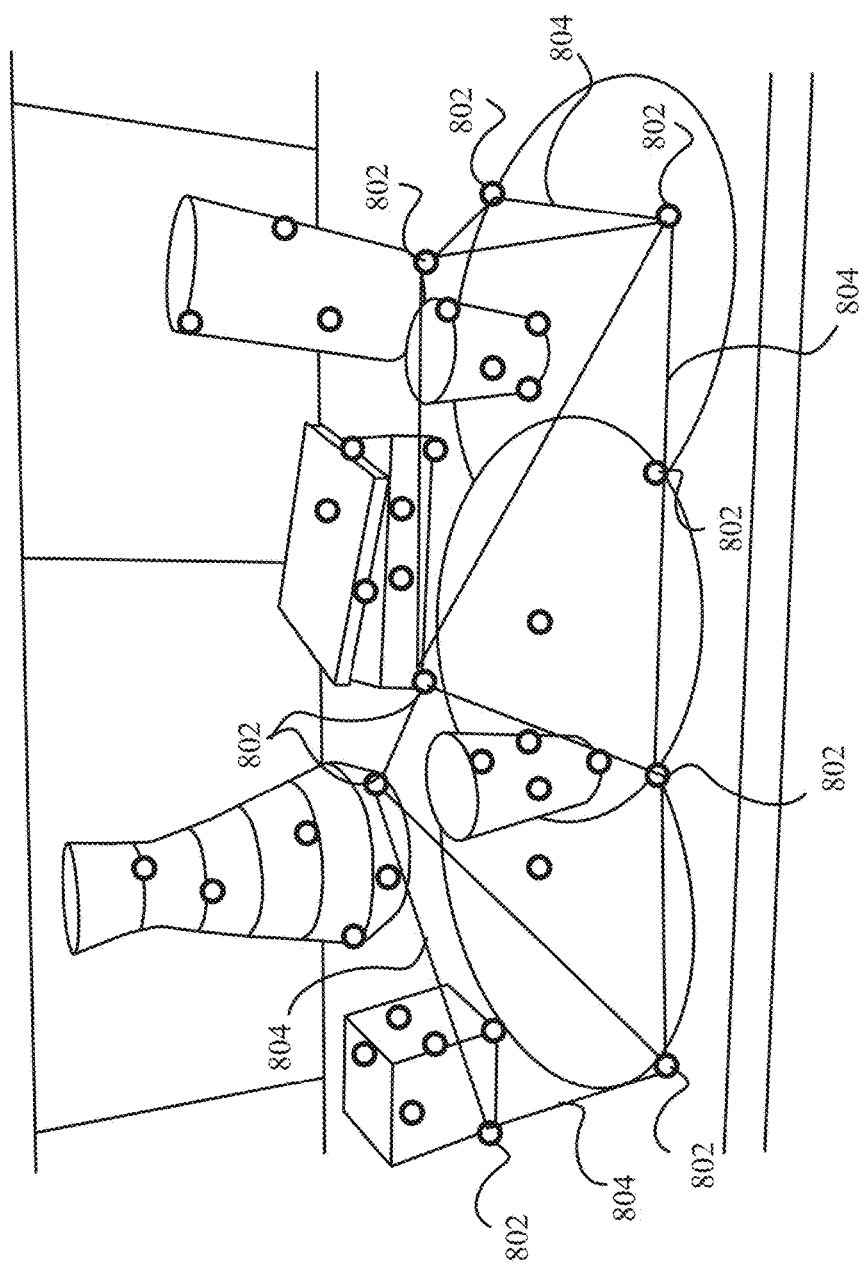
FIG. 8 illustrates an example of a point cloud used to create a ground plane superimposed on the corresponding physical environment.

Returning to system 600 of FIG. 6, the point cloud output by SLAM process engine 610 may include some number of approximately coplanar reference points that are used to map a ground plane by surface mapping engine 620. In a physical environment, at least one surface may be present, such as a table top, floor, the ground, etc. As such, in one instance, a plane with the largest number of coplanar reference points may be used as the ground plane. As such, AR objects placed on the ground plane are intended to appear as if sitting on top of the physical surface that is serving as the ground plane. Referring to FIG. 8, the outer reference points that were determined to fall on the plane that is to serve as the ground plane, may be connected to form the outer limits of the ground plane. The ground plane may be extended by further mapping of the surface via additional processes, including mapping the surface based on color.

In some embodiments, the ground plane is selected by the user as input to surface mapping engine 620. For instance, in a captured image, a user may select the surface to use as the ground plane. Otherwise, the ground plane may be found by fitting a plane to as many reference points as possible by surface mapping engine 620. FIG. 8 illustrates a visual example of a ground plane fit to reference points determined to be coplanar. The reference points fitted to the ground plane are indicated by 802. The lines 804 between the reference points 802 may represent the outer extent of the ground plane.

For the ground plane created by surface mapping engine 620, multiple cells may be created. Each cell may be a polygon that falls entirely within the ground plane. In some embodiments, the polygons created may be three or four sides and may all be coplanar with the ground plane. Vertices of polygons may be reference points that define the extent of the ground plane.

Figure 9:
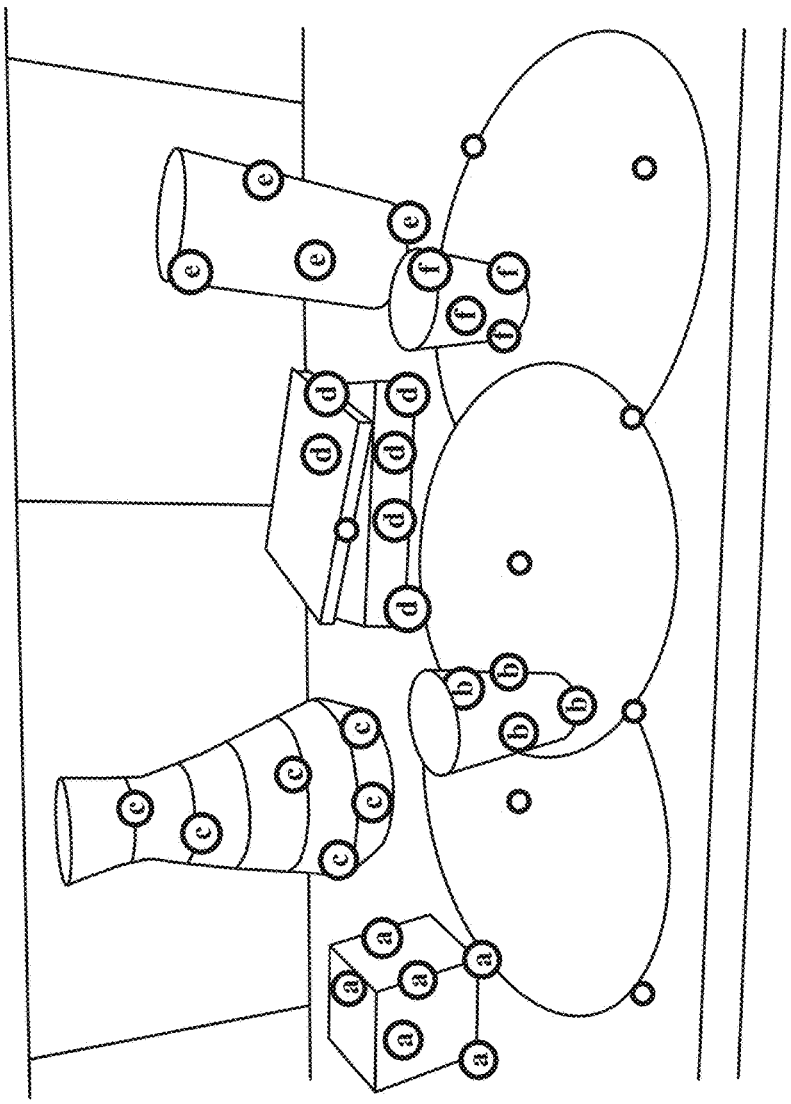
FIG. 9 illustrates an example of a point cloud clustered according to object superimposed on the corresponding physical environment.

Returning to system 600 of FIG. 6, the point cloud output by SLAM process engine 610 may be analyzed by point cloud clustering engine 630. Point cloud clustering engine 630 may cluster reference points according to what object the reference points are determined to be part of Reference points determined to be part of the ground plane may be excluded from analysis by point cloud clustering engine 630. Reference points determined to belong to a same object, such as based on location, depth, identified boundaries and/or color properties may be clustered together. Referring to FIG. 9, the reference points indicated by the different letters from the English alphabet (a, b, c, d, e f) of the point cloud represent points that have been clustered together. Letter 'a' reference points correspond to the tissue box; letter 'b' reference points correspond to the tall cup; letter 'c' reference points correspond to the woven vessel; letter 'd' reference points correspond to the books; green reference points correspond to the small cup; letter 'e' reference points correspond to the candle; and the unmarked reference points correspond to the table's surface.

Figure 10:
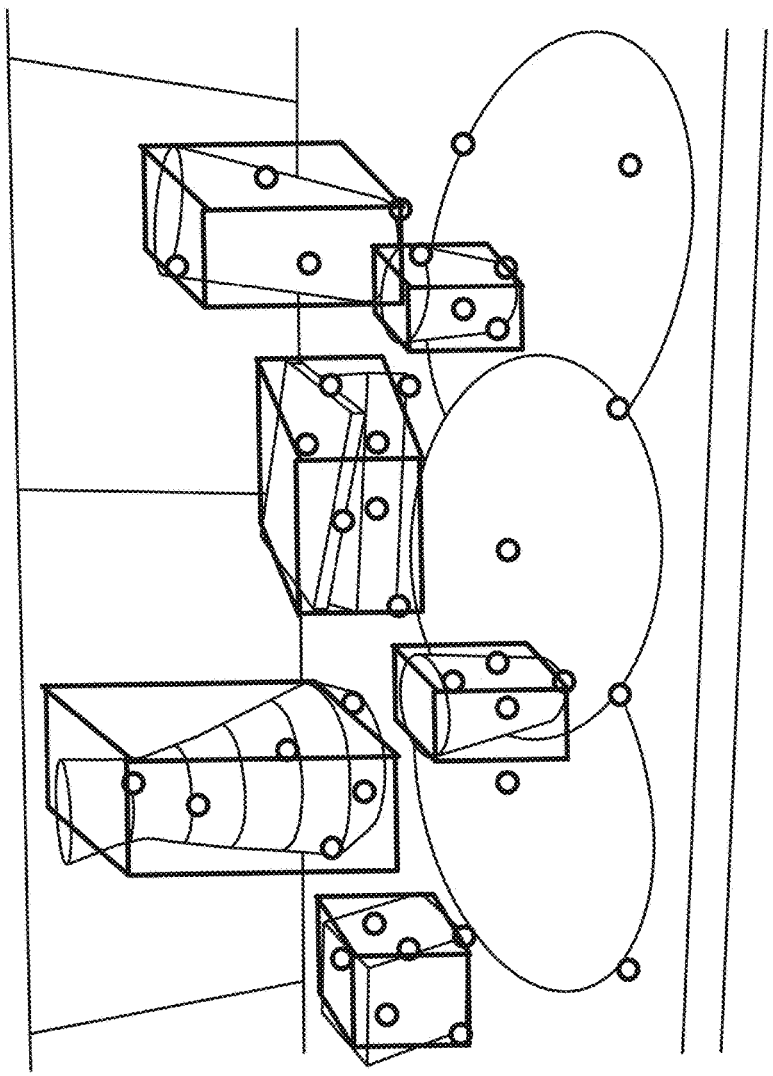
FIG. 10 illustrates an example of a model of three-dimensional physical objects superimposed on the corresponding physical environment.

Object modeling engine 640 may serve to model physical objects that were identified based on clustered reference points by point cloud clustering engine 630. Object modeling engine 640 may use simplified geometric shapes to model the objects identified based on clustered reference points by point cloud clustering engine 630. For instance, referring to FIG. 10, six-sided three-dimensional geometric shapes may be used to model each physical object. Alternatively, more complex geometry may be used to create more accurate geometric models of the identified objects. Each geometric model may be associated with a location such that each geometric model is placed in reference to the ground plane created by surface mapping engine 620. Each geometric model may be used to determine locations where virtual objects should not be placed to help maintain realism in the AR environment. In addition to the clustered reference points, color information and/or determined shape information can be used from the observed silhouettes of the physical objects to define and/or refine the associated geometric models.

Figure 11:
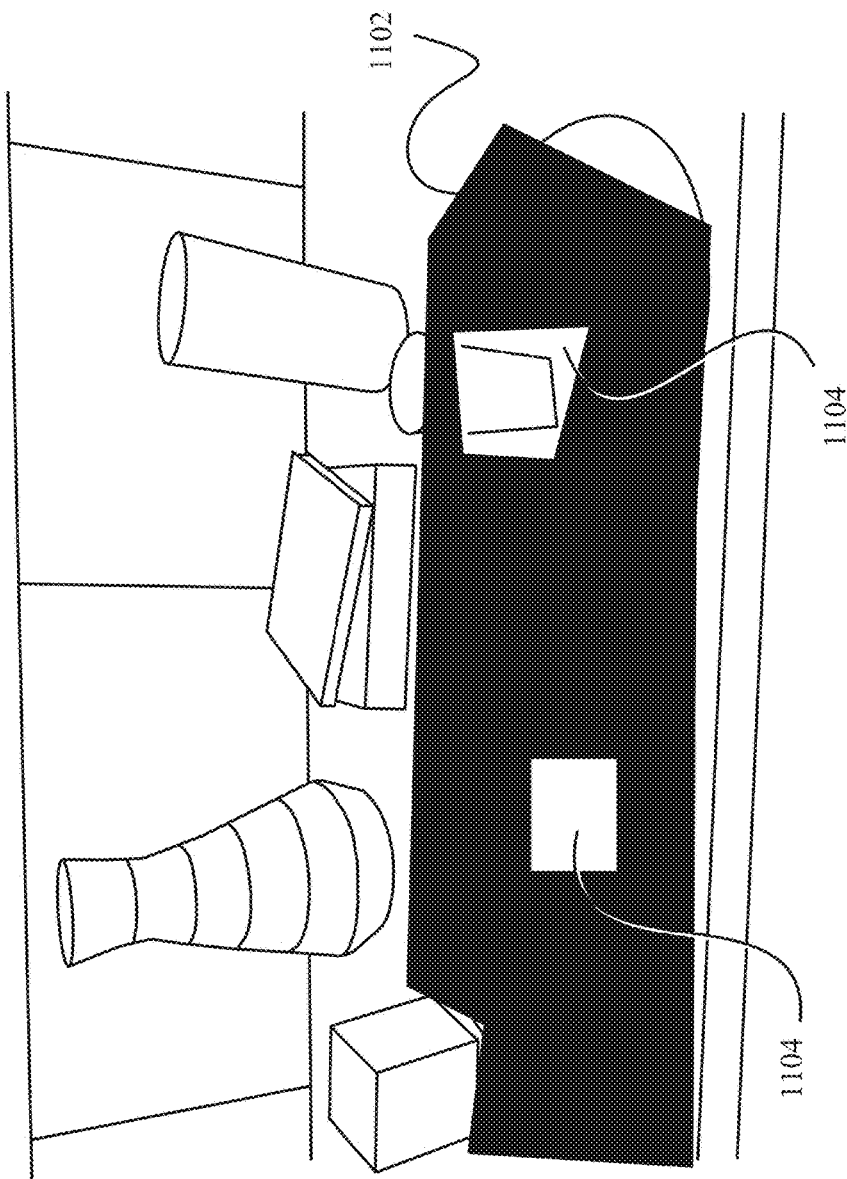
FIG. 11 illustrates an example of AR plane superimposed on the corresponding physical environment.

AR plane construction engine 650 may create a AR plane (black surface) using the ground plane determined by surface mapping engine 620 and the physical object models determined by object modeling engine 640. FIG. 11 illustrates an embodiment of an AR plane (black solid surface indicated by 1102) that is created based on the ground plane of FIG. 8 and the modeled objects of FIG. 10. Creation of the AR plane may include clipping (or otherwise removing) from the ground plane portions of the ground plane that intersect with or contact the modeled objects. This may involve reducing the extent of the ground plane and/or removing one or more regions from the ground plane to create the AR plane. Creation of the AR plane may involve cells of the ground plane being subdivided to avoid modeled objects (e.g., one or more subdivsions of the cell may be maintained as a cell in the AR plane, and one or more subdivisions of the cell may be excluded from the AR plane because it overlaps or contacts a modeled object. Vertices of the new cells may or may not correspond to reference points from the point cloud that were previously identified as part of the ground plane. For a cell to be part of the AR plane, the cell may be required to be distinct from any overlapping object identified by object modeling engine 640. Therefore, from within a cell of the AR plane, a straight line to any other point on the cell may be drawn without intersecting a modeled object. "Holes," indicated by 1104 in FIG. 11, within the AR plane exist where modeled physical objects are located. The AR plane does not include such regions that correspond to modeled physical objects.

Whenever a virtual object is located on a AR plane cell, it is known the virtual object will not collide with any static object that was modeled in the physical environment. As such, the virtual object is free to be positioned or move on or among cells of the AR plane without colliding with any physical objects.

Returning again to FIG. 6, AR plane implementation application 660 may represent an application that uses the AR plane created by AR plane construction engine 650. AR plane implementation application 660 may receive coordinates of the cells of the AR plane that can be superimposed on images captured of the physical environment. Therefore, the AR plane received by AR plane implementation application 660 is based on the real-world, physical environment on which AR plane implementation application 660 is going to position or move one or more virtual objects without colliding with physical objects present in the environment. The AR plane may be positioned such that it appears to be placed on a surface present in the physical environment, such as a tabletop. For instance, AR plane implementation application 660 may permit manipulation of three dimensional virtual objects on the AR plane determined by AR plane construction engine 650. AR plane implementation application 660 may use the AR plane for path planning, such as to determine how a virtual object should move among cells of the AR plane without colliding with a modeled physical object. AR plane implementation application 660 may be configured such that virtual objects, when remaining within a cell of the AR plane, can be moved in a straight line in any direction without colliding with a modeled physical object. Edges of the AR plane may serve as the limit of where virtual objects can be placed or move.

Figure 12:
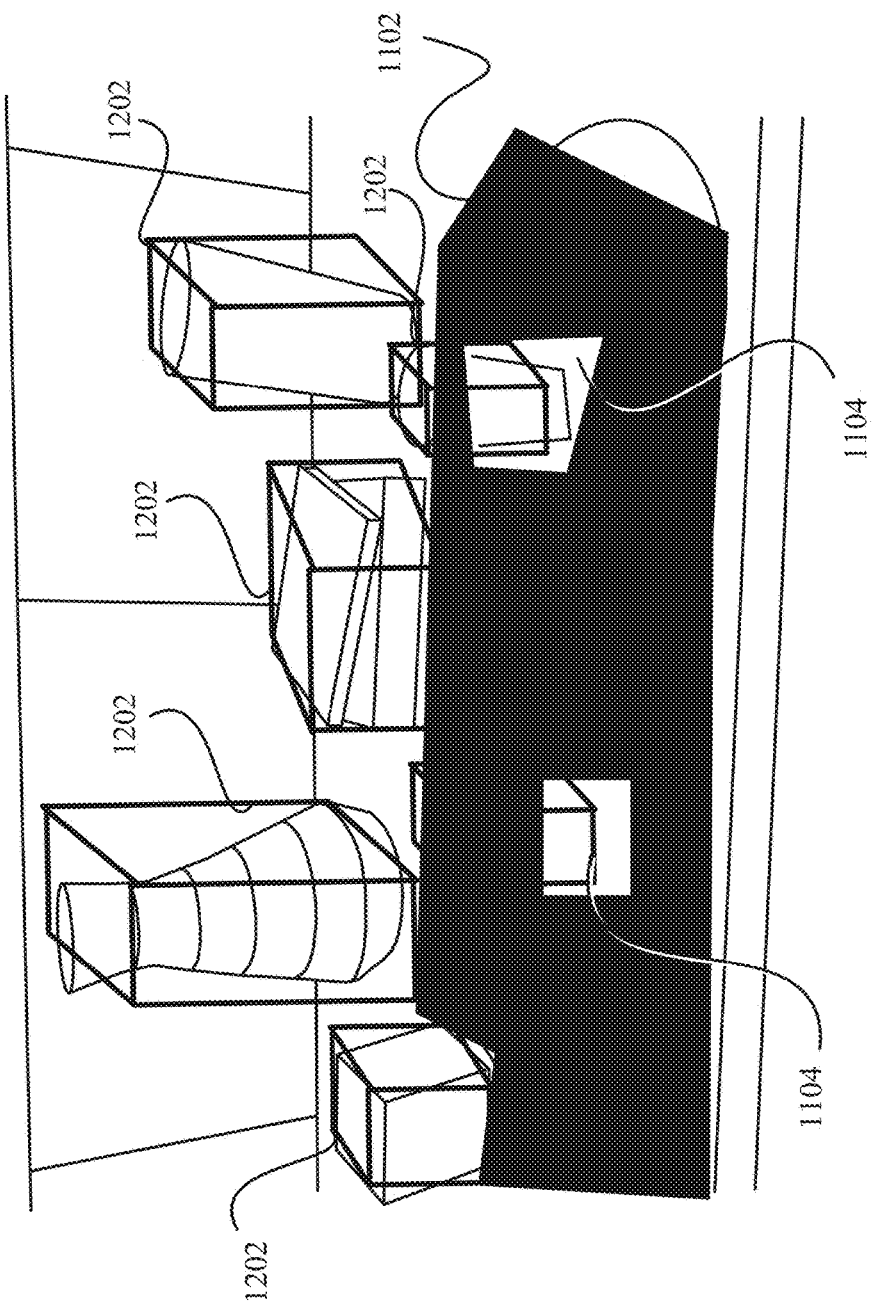
FIG. 12 illustrates an example of AR plane and models of three-dimensional physical objects superimposed on the corresponding physical environment.

In addition to receiving coordinates of the cell of the AR plane, AR plane implementation application 660 may receive modeling information for the objects. This modeling information may be the geometric models for objects determined by object modeling engine 640. This modeling information may include height information for the objects. While the AR plane may ensure that a virtual object does not collide with the virtual object, the modeling information provided to AR plane implementation application 660 may allow for virtual objects to be hidden from view when on the AR plane behind a modeled physical object. Additionally, virtual information (e.g., graphics) may be overlaid one or more of the modeled objects to augment or change the appearance of the physical objects in the AR environment. For instance, the small cup may be made to appear as a house in the AR environment. Additionally or alternatively, in some embodiments edges of the AR plane are assigned properties, such as "wall edge" or "cliff edge" which can be result in different handling by AR plane implementation application 660. A wall edge may represent an edge of the AR plane where an obstacle exists that prevents a virtual object from being moved farther (e.g., a wall, a large object); a cliff edge may represent an edge of the AR plane where an edge exists from which a virtual object could fall (e.g., a table edge). FIG. 12 illustrates the geometric models 1202 of the physical objects created and located by object modeling engine 640 in conjunction with the AR plane created by AR plane construction engine 650. The information for the AR plane and the geometric models of the physical objects may be output to AR implementation application 660.

Figure 13:
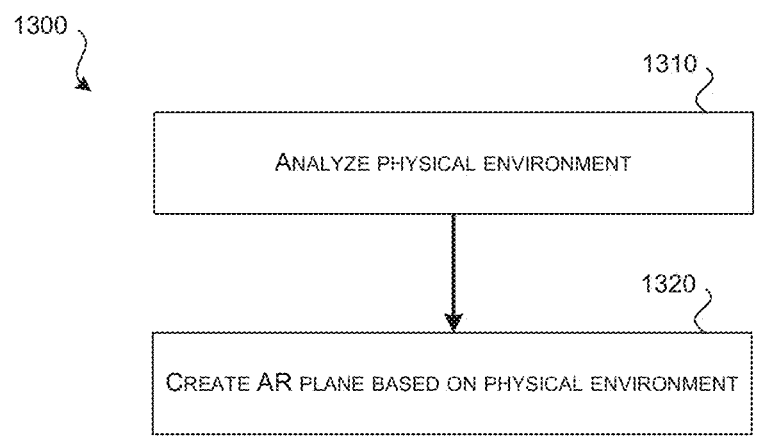
FIG. 13 illustrates an example process for creating an AR plane according to certain aspects of the disclosure.

FIG. 13 illustrates an embodiment of a method 1300 for creating a AR plane. Method 1300 may be performed by the computing device of FIG. 20 or by some other system configured to present analyze a physical environment.

At block 1310, a physical environment may be analyzed. The physical environment may include one or more physical objects and at least one surface on which virtual objects are desired to be placed. Block 1310 may include capturing and analyzing one or more images of the physical environment. Block 1310 may include calculating depth information about various reference points that are present on either the surface or the one or more physical objects. Analyzing the physical environment at block 1310 may include one or more of the processes discussed in relation to engines 610, 620, 630, 640, and 650 of system 600 of FIG. 6 being performed.

At block 1320, an AR plane may be created based upon the analysis of block 1310. The AR plane may include multiple cells. Each cell may have three or four sides. When on a cell of the AR plane, a virtual object is known to not collide with any of the physical objects present in the AR environment. When remaining on a particular cell, the virtual object may move in a straight line in any direction along the plane of the AR plane and not collide with any of the physical objects in the AR environment, since the AR plane comprises holes for physical objects, as described previously. The AR plane created at block 1320 may be output in form of coordinates of the various cells of the AR plane. The AR plane may be linked with a reference point of an image of the physical environment.

Figure 14:
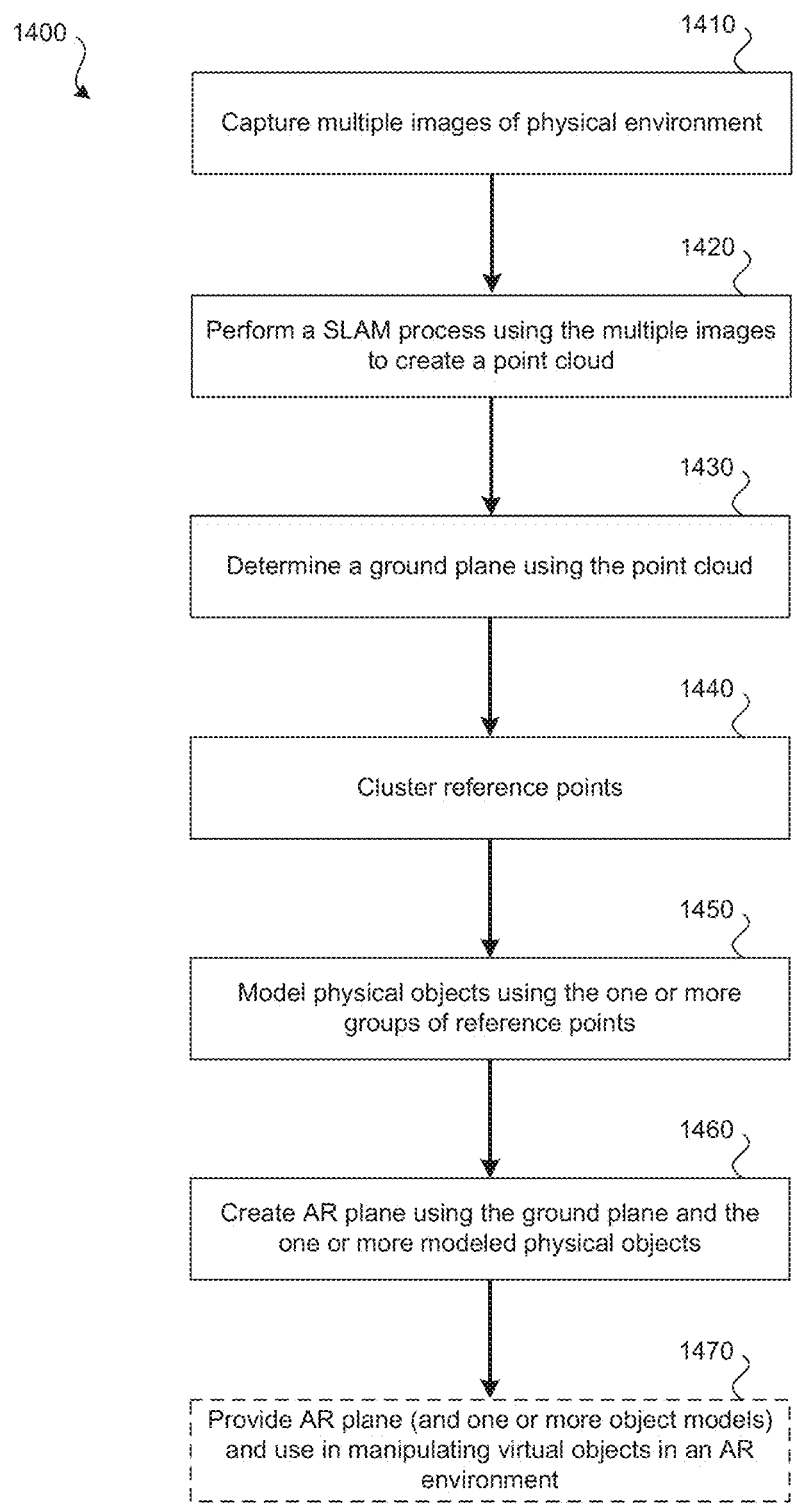
FIG. 14 illustrates an example process for creating and using an AR plane according to certain aspects of the disclosure.

FIG. 14 illustrates an embodiment of a method 1400 for creating and using an AR plane. Method 1400 may be performed by the system and/or computing device of FIG. 20 or by some other system configured to present analyze a physical environment. Means for performing the steps of method 1400 include one or more instances of the components of the computing device of FIG. 20. Method 1400 may represent a more detailed embodiment of method 1300 of FIG. 13.

At block 1410, multiple images of a physical environment may be captured. The one or more images may be captured using camera 2021 (FIG. 20). Within the physical environment one or more surfaces on which virtual objects are to be placed may be present. The physical environment may also include one or more physical objects, which when represented in an AR environment, are not permitted to collide with a virtual object. An amount of movement of the camera used to capture the multiple images may be measured as part of block 1410.

At block 1420, a SLAM process may be performed. The SLAM process may create a point cloud of reference points based on physical objects present in one or more of the images of the physical environment captured by a camera. The SLAM process may identify various reference points within each image. At least some of the same reference points may be identified in at least two of the multiple captured images. Using a triangulation-based process, the SLAM process may determine the depth of at least some of the reference points present within the images. The SLAM process may result in a point cloud that includes multiple points, each having three-dimensional coordinates (including a depth value). Each of these points may correspond to a reference point present in at least two of the multiple captured images (from the camera or other form of image capture device). In some embodiments, the point cloud representing the physical environment may be created using a modeling process other than a SLAM process, such as other forms of three-dimensional mapping processes, without deviating from the scope of the invention.

At block 1430, a ground plane may be determined using reference points from the point cloud. The point cloud output by block 1420 may have at least some approximately coplanar reference points that are used to create a ground plane. In a physical scene, it may be assumed that at least one surface is present, such as a table top, floor, the ground, etc. As such, the largest cluster of reference points to which a plane can be fit (within a predefined margin of error) may be used to define a ground plane. The ground plane may be automatically selected to serve as the surface of the AR plane. As such, AR objects placed on the ground plane are intended to appear as if sitting on top of the physical surface that is serving as the ground plane. The ground plane may be extended by further mapping of the surface via additional processes, including mapping the surface based on color. In some embodiments, rather than calculating the ground plane, the ground plane may be selected by the user via user input. For instance, in a captured image, a user may select the surface to be used as the ground plane by providing input through a user interface (not shown), such as highlighting portions of the surface using a touchpad or stylus on the screen of the mobile device. In some instances, regardless of the method used for identifying the ground plane, the created ground plane may contain multiple cells based on the outlying vertices of the ground plane. Each cell of the ground plane may be a polygon that falls entirely within the ground plane. In some embodiments, the polygons created may be three or four sides and may all be coplanar with the ground plane.

At step 1440, reference points that were not determined to be part of the ground plane may be grouped into one or more clusters. Reference points may be clustered according to what object the reference points are determined to be part of. The clustering of the reference points not part of the ground plane may be performed using a variety of different criteria, such as based on spatial proximity of points, color associated with the reference points. Reference points determined to belong to a same object, such as based on location, depth, identified boundaries and/or color properties may be clustered together. As such, the number of clusters may be dependent on the number of physical objects in the imaged physical environment.

At block 1450, physical objects of the physical environment may be modeled based upon the clusters identified at block 1440. Simplified geometric models may be used to model the objects identified based on clustered reference points. More complex geometry may be used to create more accurate geometric models of the identified physical objects. Each geometric model may be associated with a location such that each geometric model is placed in reference to the ground plane. Each geometric model may be used to determine locations where virtual objects should not be placed to help maintain realism in the AR environment.

At block 1460, an AR plane may be created using the ground plane from block 1430 and the models of the physical objects from block 1450. Creation of the AR plane may include clipping (or otherwise removing) from the ground plane portions of the ground plane that intersect with the modeled physical objects. This may involve reducing the extent of the ground plane and/or creating one or more holes in the ground plane to create the AR plane. For a cell to be part of the AR plane, the cell may be required to be completely separate from any overlapping modeled physical object. Therefore, from within a cell of the AR plane, a straight line to any other point on the same cell may be drawn without intersecting a modeled object. "Holes" within the AR plane can exist where modeled physical objects are determined to be located.

At block 1470, the AR plane may be optionally provided to an application and used by the application for manipulating virtual objects in the AR environment. The AR plane may be output in the form of coordinates that define the cells of the AR plane. Therefore, the AR plane output may be based on the real-world, physical environment on which one or more virtual objects are to be positioned or moved in an AR environment without giving the appearance of collision with physical objects in the physical environment. The AR plane may be positioned such that it appears to be placed on a surface present in the physical environment, such as a tabletop. The AR plane may be used by an application for path planning, such as to determine how a virtual object can be moved among cells of the AR plane without colliding with a modeled physical object in the AR environment. Virtual objects, when remaining within a cell of the AR plane, can be moved in a straight line in any direction without colliding with a modeled physical object. Edges of the AR plane may serve as the limit of where virtual objects can be placed or move. Therefore, within the application, the AR plane may be used to restrict movement of virtual objects within the AR environment so that the virtual objects do not appear to collide with physical objects of the physical environment on which the AR environment is superimposed.

An example of when a AR plane may be useful is a game being played in an AR environment superimposed on a physical environment. The AR plane may be used to determine where non-player characters (which may be virtual objects) can move without appearing to collide with physical objects in the AR environment. For instance, non-player characters may move towards the player's character while remaining on the AR plane (and thus avoiding the appearance of collision with physical objects). As long as the game can interpret the provided AR plane such that non-player characters remain on the AR plane, the game may not need to interpret the actual physical environment while still giving the appearance of avoiding physical objects that are present in the AR environment. As an additional example, the AR plane may also be used to restrict the position and location of player motion, such as a character controlled by a user in an application that permits three-dimensional movement. Virtual objects within the application may similarly be limited in movement by the AR plane. Virtual objects, a player's character, and non-player characters may be represented by a single three-dimensional bounding box (or a more detailed polygon mesh) with the bounding box maintained on the AR plane.

Besides games, other situations exist where a AR plane may be useful in an AR environment. For example, modeling how an object looks in a particular physical environment, such as a coffee machine (virtual object) that the user is thinking of purchasing in the user's kitchen, or a new car in the user's garage. The AR plane may be used for manipulating the virtual object while avoiding physical objects in the AR environment. Therefore, the coffee machine would not be allowed to be placed in collision with a blender (a physical object) on the user's kitchen counter, but could be placed on an empty spot on the user's kitchen counter that is available for movement according to a created AR plane.

In addition to receiving coordinates of the cells of the AR plane being output to an application, modeling information for the one or more physical objects may be output. This modeling information may be the geometric models for objects determined at block 1450. This modeling information may include height information for the objects. While the AR plane may ensure that a virtual object does not collide with the virtual object, the modeling information may allow for virtual objects to be hidden (or otherwise modified for display) when present on the AR plane in the AR environment behind a modeled physical object. Additionally, virtual information (e.g., graphics) may be overlaid one or more of the modeled objects by the application to augment or change the appearance of the physical objects in the AR environment. FIG. 15A illustrates a hole 1510-A from FIG. 3 that may include not only a first portion 1530 in which the AR plane 310 would be occluded by the corresponding object 215 even when the planar surface 210 is viewed fronto-parallel, but also a second portion 1520-A comprising an area in which the AR plane is occluded due to the angled perspective of the computing device 102 when capturing the one or more images of the planar surface 210 and object 215. (In the example illustrated, the computing device 102 (not shown) would be located on the opposite side of the object as the second portion 1520-A.) The second portion 1520-A is therefore due to a projection, or "shadow," of the object 215, which, from the perspective of the computing device 102 when the one or more images are captured, occludes a portion of the planar surface 210 behind the object 215.

In FIG. 15A, since the hole 1510-A is larger than the corresponding object 215, a representation of the object 215 that is generated based on the dimensions of the hole 1510-A would be inaccurate. Reducing the size of the second portion 1520-A, not only can provide for a more accurate representation of the planar surface 210, but also a more accurate representation of the object 215.

Figure 15B:
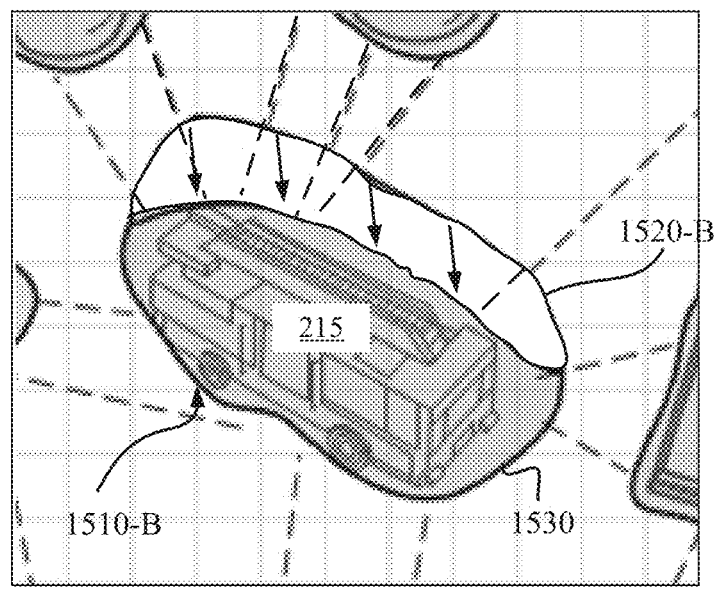

FIG. 15B illustrates a modified hole 1510-B (shaded region) in which the second portion 1520-B has been reduced or removed (as indicated by the line and arrows) to a smaller size. As discussed in more detail below, techniques can utilize not only information regarding the planar surface itself, but also feature point information (which can be provided by SLAM) to intelligently estimate the dimensions for the reduced second portion 1520-B.

Figure 16:
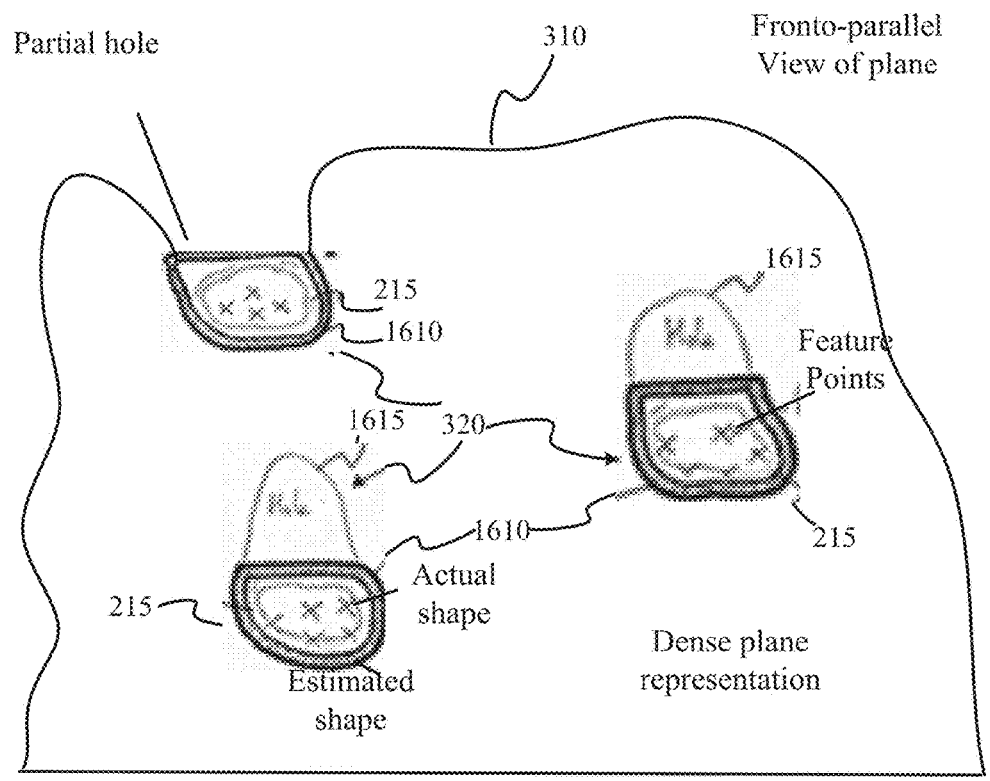
FIG. 16 is a simplified example fronto-parallel view of a dense plane representation of a planar surface according to certain aspects of the disclosure.

FIG. 16 is a simplified fronto-parallel view of an AR plane 310 of a planar surface according to one embodiment. The AR plane 310 has holes 320, due to occlusions caused by objects on the planar surface. The holes 320 further include portions 1615 projected onto the AR plane 310 away from the camera viewing direction due to the perspective of the camera. The darkened outlines 1610 surrounding the objects 215 represent estimations of the shapes of the objects 215 that can be achieved from the techniques provided herein.

Information about the objects 215 not only can be gleaned from the AR plane 310, but also from SLAM and/or other techniques providing feature points of the objects 215. Feature points (each represented as an "x" in the objects 215 of FIG. 17) can be points on an external surface of the objects 215 about which location information is gathered. Such information can, for example, indicate the height of the feature point above the AR plane 310 of the planar surface, as well as a distance to the front (or other edge) of a hole 220. Here, the "front of a hole" is the closest portion of the planar surface, from the perspective of at least one captured image of the camera, occluded in the at least one captured image by the object. These feature points can be used, together with information about the AR plane 310, to estimate the geometry of the portion of the object 215 that is not visible.

Figure 17:
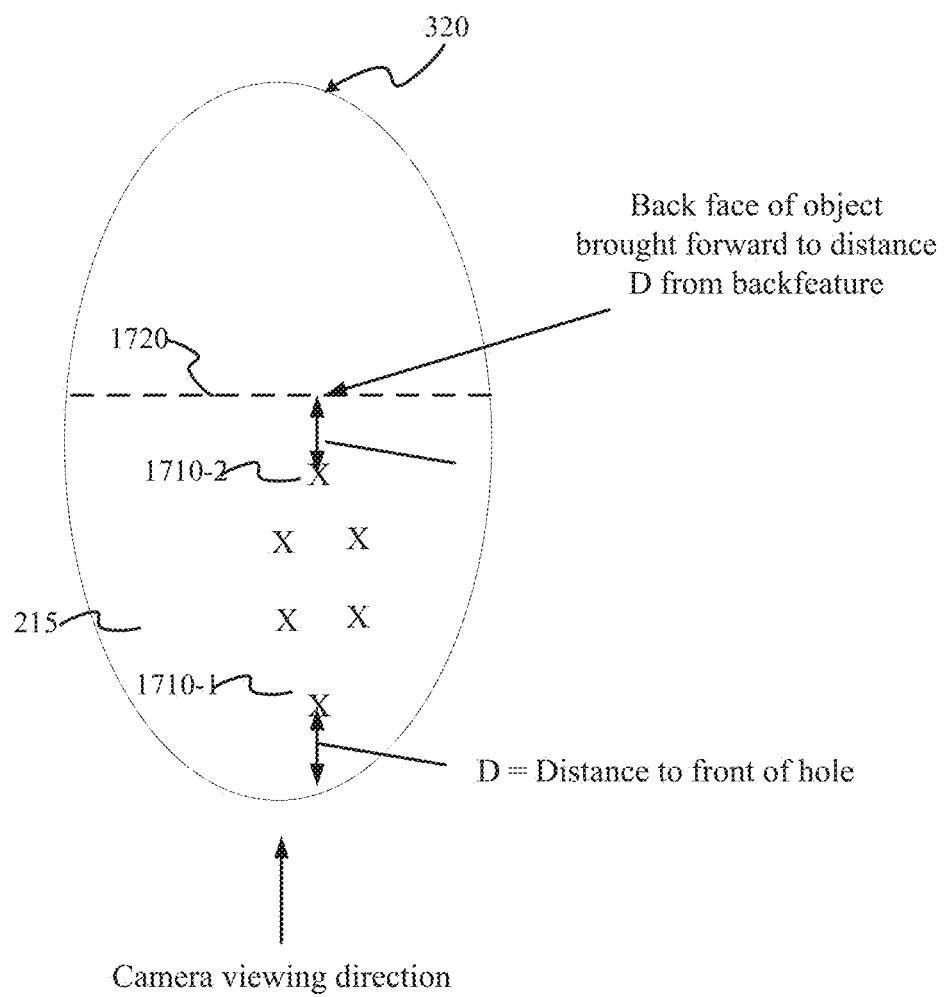
FIG. 17 is a simplified fronto-parallel view of a hole in a dense plane representation of a planar surface, illustrating an example of how the geometry of a portion of an object may be estimated.

FIG. 17 is a simplified fronto-parallel view of a hole 320 in a dense AR plane 310 of a planar surface, illustrating an example of how the geometry of a portion of an object can be estimated. In this example, a closest feature point 1710-1 of the object (from the perspective of the camera viewing direction) is determined, and a distance D from the closest feature point 1710-1 to the front of the hole 320 is determined. The back of the hole can then be estimated as a plane that extends back—using the same distance D—from the farthest feature point 1710-2 to a plane 1720. In this example, as shown, the estimated footprint of the object 215 is far smaller than the hole 320 because the portion of the object 215 that is not visible is now estimated to extend back only to the plane 1720 rather than the back of the hole 320. Accordingly, a representation of the object 215 can be generated in which the unseen portion of the object 215 extends back only to the plane 1720. An extension would be to estimate a curved/spline-based back-surface representation based on distance metrics of the front face to the feature points 1710-1.

Depending on desired functionality, embodiments can employ additional or alternative algorithms to estimate the geometry of the portion of the object 215 not visible in one or more images captured by a mobile device. For example, the estimated geometry does not need to be planar, but instead can be curved or given other features. In one example, a two-dimensional midpoint of the feature points of an object, in a fronto-parallel view, can be calculated (using, for example, x and y coordinates in a plane of planar surface), and the feature points can be "flipped" around the midpoint (e.g., by rotating 180 around the midpoint or by providing a mirror image of the feature points, reflected on a plane parallel to the cameral viewing direction that includes the midpoint), thereby creating a reflected symmetrical object representation. In another example, the midpoint can be calculated, and the back face of the object can be estimated as a curved surface having the radius given by the distance of the midpoint to the front of the hole. The estimated back surface, then, is cylindrical in shape. Other algorithms may include variance in the back surface as a function of height above the planar surface. Where an estimation provides a footprint that may be larger than the hole itself (i.e., it would occlude a visible portion of the planar surface), it can be truncated by the bounds of the hole.

Based on the shape of a hole in the fronto-parallel view of the plane, an object representation can be formed by extruding the object in the direction normal to the plane surface. The height of the extrusion can be bounded by several pieces of information, including: (1) The silhouette of the object in an image. If there are images where the object silhouette falls against the plane due to camera angle, this silhouette can give a maximum bound for the height of the object. In other words, a reasonable representation of an object may be inferred by observing the silhouette for the object in the rectified image in multiple views against the plane. In some instances, this may be referred to as space carving. The silhouette of the object can be inferred by observing the boundary of the object against the plane, and using the boundary to carve away areas that are not the object. In one implementation, this may be used to bound the height. In another implementation, an accurate representation of an object, rather than just an excluded hole, may be detected by performing space carving. (2) Point features can further be utilized to estimate the shape of the top of the object. For example, some embodiments may use the highest feature points to bound the extruded height of the object. Additionally or alternatively, a variable-height surface to the extruded shape can be based on the heights of feature-points in the hole, e.g. using a spline representation or piecewise planar representation.

It can be noted that the AR plane 310 may still be refined during the object reconstruction process. As the camera is moving around and the plane representation is refined, holes may appear in the representation. An object lying on top of the plane is likely to occupy some portion of the hole in the plane. Additionally, the height of the object is not known exactly (the silhouette of the object in different frames does provide constraints).

Other techniques may be used for detecting properties associated with a physical object from image information without deviating from the scope of the invention, such as dense stereo or photo-consistency over multiple views.

Figure 18:
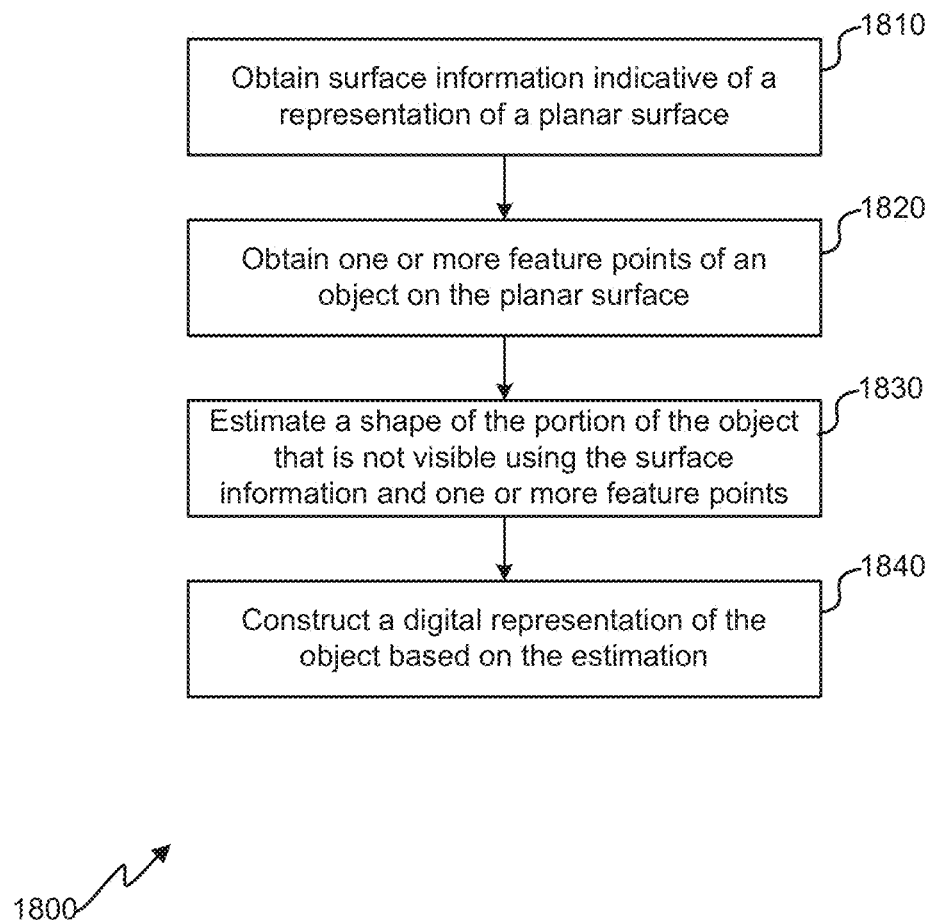
FIG. 18 illustrates an example process for constructing a digital representation of an object on a planar surface of a physical scene.

FIG. 18 illustrates an embodiment of a method 1800 for constructing a digital representation of an object on a planar surface of a physical scene. Means for performing one or more of the components of the method 1800 can include hardware and/or software means described in further detail in relation to FIG. 20. Alternative embodiments may include alterations to the embodiments shown. Components of the method 1800, although illustrated in a particular order, may be performed in a different order and/or simultaneously, according to different embodiments. Moreover, a person of ordinary skill in the art will recognize many additions, omissions, and/or other variations.

The method 1800, and other techniques described herein, can be executed by hardware and/or software at an operating system- or device-level. Representations of the planar surface (i.e., the AR plane) and/or objects can then be provided to an AR, CV, or other application executed by the mobile device. The representations can be provided in any of a variety of standardized and/or proprietary formats (e.g., mesh (triangles and/or polygons in 3D space), etc.). Moreover, the representations can be provided in substantially real time or near-real time, so that an AR application is able to display an AR environment while images of a physical scene are being captured by a mobile device.

At block 1810, surface information indicative of a representation of a planar surface (i.e., AR plane) is obtained. As indicated previously, surface information can be based on at least one captured image of a physical scene. Techniques described with reference to FIGS. 13, 14 and any other figure described earlier may be used for deriving an AR plane using surface information. The representation can be, for example, a dense plane representation obtained using any of a variety of algorithms for defining the plane from image information. These algorithms may be executed by the same application—or a different application—than an application executing the method 1800 of FIG. 18.

Block 1820 includes obtaining one or more feature points of an object on the planar surface. Feature points can include information indicative of a location of a point on an external surface of the object in a 3D space (e.g., relative to the planar surface). These feature points can be derived, for example from a point-cloud representation of the object provided by SLAM.

At block 1830, a shape of the portion of the object that is not visible is estimated using the surface information and the one or more feature points. As previously indicated, any of a variety of algorithms may be used to estimate a back face of the object. These algorithms can combine feature point information (e.g., height, depth, etc.) with surface information (e.g., hole locations, dimensions, etc.) to provide the estimation. The estimation may further include transforming the surface information and the one or more feature points to a fronto-parallel perspective of the planar surface. In certain implementation, pose information regarding the one or more images may be used in transforming the surface information and the one or more feature points to a fronto-parallel perspective of the planar surface. Estimations may further include determining a highest (relative to the planar surface) and/or nearest (from the perspective of the one or more captured images) feature point of an object. Estimations may include a particular shape. For example, the estimation may represent the back face of the object in a spline, curved, and/or planar representation.

At block 1840, a digital representation of the object is constructed, based on the estimation. As indicated above, the digital representation can include the representation of the estimated (i.e., unseen) portion of the object, as well as visible portions of the object. The digital representation, then, can incorporate feature points to provide a geometric shape to visible portions of the object. As indicated previously, the representation can then be sent to and/or utilized by a CV application.

Figure 19:
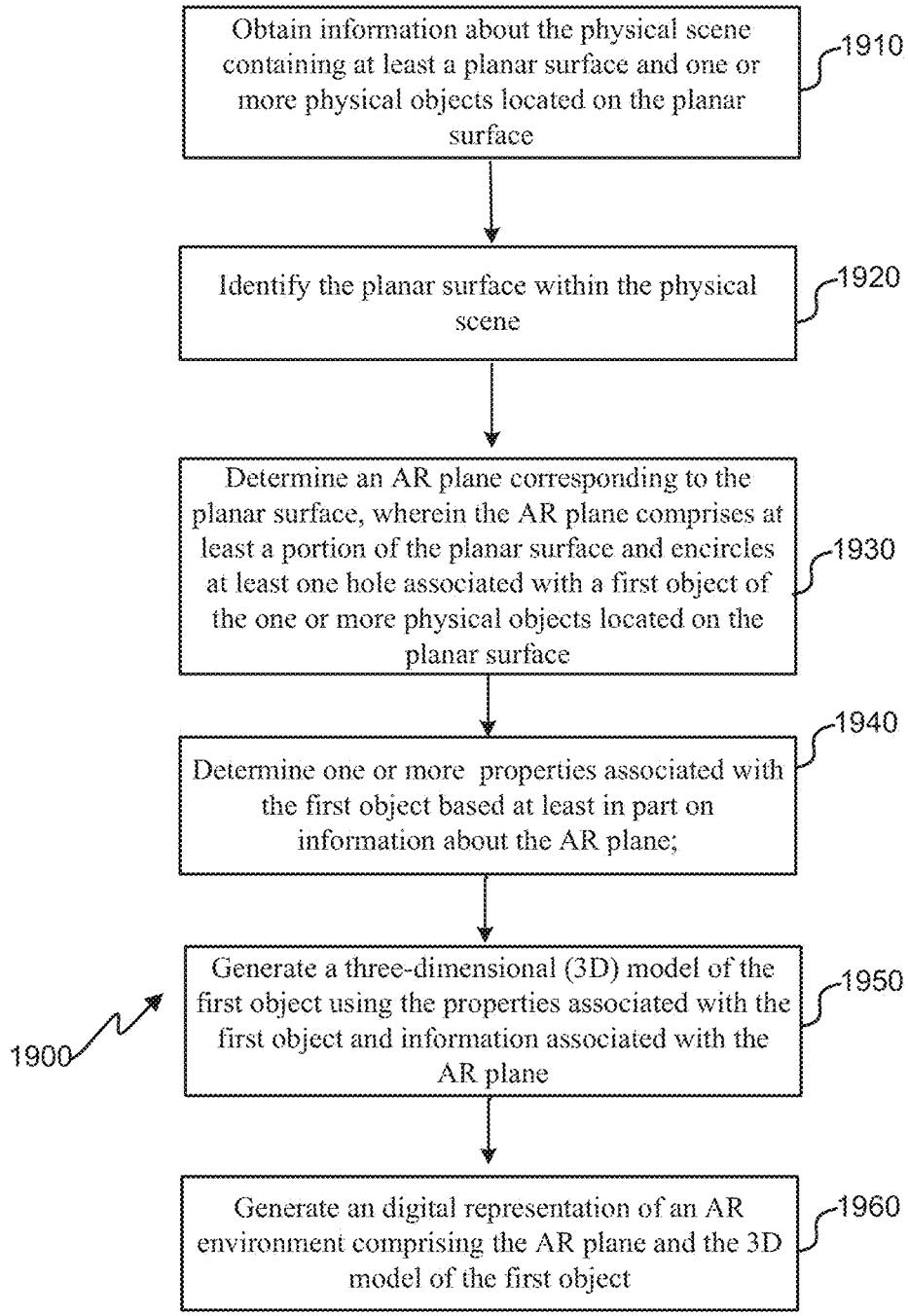
FIG. 19 illustrates an example flowchart for constructing a digital representation of a physical scene.

FIG. 19 illustrates an embodiment of a method 1900 for constructing a digital representation of an object on a planar surface of a physical scene. Means for performing one or more of the components of the method 1900 can include hardware and/or software means described in further detail in relation to FIG. 20. Alternative embodiments may include alterations to the embodiments shown. Components of the method 1900, although illustrated in a particular order, may be performed in a different order and/or simultaneously, according to different embodiments. Moreover, a person of ordinary skill in the art will recognize many additions, omissions, and/or other variations.

The method 1900, and other techniques described herein, can be executed by hardware and/or software at an operating system- or device-level. Representations of the planar surface (i.e., the AR plane) and/or objects can then be provided to an AR, CV, or other application executed by the mobile device. The representations can be provided in any of a variety of standardized and/or proprietary formats (e.g., mesh (triangles and/or polygons in 3D space), etc.). Moreover, the representations can be provided in substantially real time or near-real time, so that an AR application is able to display an AR environment while images of a physical scene are being captured by a mobile device.

At block 1910, components of the computing device obtain information about the physical scene containing at least a planar surface and one or more physical objects located on the planar surface. In some instances, a camera may capture information about the physical scene. In other instances, the information may be either provided to the computing device or stored in a buffer on the computing device. At block 1920, components of the computing device identify the planar surface within the physical scene.

At block 1930, components of the computing device determine an AR plane corresponding to the planar surface wherein the AR plane comprises at least a portion of the planar surface and encircles at least one hole associated with a first object of the one or more physical objects located on the planar surface. In certain embodiments, the AR plane comprises a plurality of cells, each cell of the plurality of cells representing a region wherein a virtual object can navigate without collision with the first object.

In some implementations, determining an AR plane corresponding to the planar surface may include analyzing at least two images of the physical scene comprising the first object, and based upon analysis of the at least two images of the physical scene, creating the AR plane such that the AR plane corresponds to the physical scene and excludes at least one region corresponding to the first object.

Furthermore, in some implementations, analyzing the at least two images of the physical scene may include capturing, using a camera, a first image of the physical scene at a first location, wherein the first image includes the first object, determining a distance that the camera has moved from the first location to a second location, capturing, using the camera, a second image of the physical scene at the second location, wherein the second image includes the first object, and determining depth information for the first object using the first image and the second image.

In some implementations, determining the AR plane corresponding to the planar surface may include identifying an initial portion of the planar surface within the physical scene, and identifying additional portions of the planar surface, wherein each of the additional portions is identified as being a part of the planar surface based on determining a likeness between at least one visual or geometric property associated with the additional portions with at least one corresponding visual or geometric property associated with one or more portions already identified to be part of the planar surface.

In some aspects, identifying the additional portions of the planar surface may include establishing a model of a planar region within which the planar surface resides, partitioning the planar region into a plurality of cells, and evaluating each cell as a potential additional portion of the planar surface. In some instances, evaluating each cell comprises iterating step for each cell identified as an additional portion of the planar surface, identifying neighboring cells not already identified as part of the planar surface, and for each identified neighboring cell, evaluating the neighboring cell as a potential portion of the planar surface.

At block 1940, components of the computing device determine one or more properties associated with the first object based at least in part on information about the AR plane. In certain embodiments, determining one or more properties associated with the first object may be further based on identifying at least one or more feature points. In certain embodiments, one or more properties associated with the first object may include identifying one or more regions in the planar surface, wherein the one or more regions correspond to location of the first object on the planar surface, and determining one or more external surfaces of the first object based on location of one or more convex regions and the one or more feature points. However, other techniques may be used without deviating from the scope of the invention. In some embodiments, constructing the digital representation of the first object may include extruding object in a direction normal to the planar surface, based on a shape of a portion of the planar surface occluded by the first object.

At block 1950, components of the computing device generate a three-dimensional (3D) model of the first object using the properties associated with the first object and information associated with the AR plane. In some aspects, generating the 3D model of the first object may include obtaining one or more feature points of the first object, wherein each feature point of the one or more feature points is indicative of a location, relative to the planar surface, of a point on an external surface of the first object, estimating, using information associated with the planar surface and the one or more feature points, a shape of a portion of the first object that is not visible, and constructing the 3D reconstructed object, based on the estimation. In some aspects, estimating a shape of a portion of the first object that is not visible may include using one or more representation techniques, such as a spline representation, a reflected symmetrical object representation, a planar representation, or a curved representation. Techniques described with reference to FIGS. 15A-B, 16, 17 and any other figure described earlier may be used for generating a three-dimensional (3D) model of the first object.

At block 1960, components of the computing device generate a digital representation of an AR environment comprising the AR plane and the 3D model of the first object.

FIG. 20 describes one potential implementation of a device which may be used to represent scenes, according to certain embodiments. In one embodiment, device 102 as described in FIG. 1 may be implemented with the specifically described details of process 300. In the embodiment of device 2000 shown in FIG. 20, specialized modules such as camera 2021 and image processing module 2022 may include functionality needed to capture and process images using the proposed method. The camera 2021 and image processing modules 2022 may be implemented to interact with various other modules of device 2000. For example, the combined image may be output on display output 2003. In addition, the image processing module may be controlled via user inputs from user input module 2006. User input module 2006 may accept inputs to define a user preferences regarding the represented scene or identify an initialization target in the scene. Memory 2020 may be configured to store images, and may also store settings and instructions that determine how the camera and the device operate.

In the embodiment shown at FIG. 20, the device may be a mobile device and include processor 2010 configured to execute instructions for performing operations at a number of components and can be, for example, a general-purpose processor or microprocessor suitable for implementation within a portable electronic device. Processor 2010 may thus implement any or all of the specific steps for operating a camera and image processing module as described herein. Processor 2010 is communicatively coupled with a plurality of components within mobile device 2000. To realize this communicative coupling, processor 2010 may communicate with the other illustrated components across a bus 2060. Bus 2060 can be any subsystem adapted to transfer data within mobile device 2000. Bus 2060 can be a plurality of computer buses and include additional circuitry to transfer data.

Memory 2020 may be coupled to processor 2010. In some embodiments, memory 2020 offers both short-term and long-term storage and may in fact be divided into several units. Short term memory may store images which may be discarded after an analysis, or all images may be stored in long term storage depending on user selections. Memory 2020 may be volatile, such as static random access memory (SRAM) and/or dynamic random access memory (DRAM) and/or non-volatile, such as read-only memory (ROM), flash memory, and the like. Furthermore, memory 2020 can include removable storage devices, such as secure digital (SD) cards. Thus, memory 2020 provides storage of computer readable instructions, data structures, program modules, and other data for mobile device 2000. In some embodiments, memory 2020 may be distributed into different hardware modules.

In some embodiments, memory 2020 stores a plurality of applications 2026. Applications 2026 contain particular instructions to be executed by processor 2010. In alternative embodiments, other hardware modules may additionally execute certain applications or parts of applications. Memory 2020 may be used to store computer readable instructions for modules that implement scanning according to certain embodiments, and may also store compact object representations as part of a database.

In some embodiments, memory 2020 includes an operating system 2023. Operating system 2023 may be operable to initiate the execution of the instructions provided by application modules and/or manage other hardware modules as well as interfaces with communication modules which may use wireless transceiver 2012 and a link 2016. Operating system 2023 may be adapted to perform other operations across the components of mobile device 2000, including threading, resource management, data storage control and other similar functionality.

In some embodiments, mobile device 2000 includes a plurality of other hardware modules 2001. Each of the other hardware modules 2001 is a physical module within mobile device 2000. However, while each of the hardware modules 2001 is permanently configured as a structure, a respective one of hardware modules may be temporarily configured to perform specific functions or temporarily activated.

Other embodiments may include sensors integrated into device 2000, an example of a sensor 2062 can be, for example, an accelerometer, a Wi-Fi transceiver, a satellite navigation system receiver (e.g., a GPS module), a pressure module, a temperature module, an audio output and/or input module (e.g., a microphone), a camera module, a proximity sensor, an alternate line service (ALS) module, a capacitive touch sensor, a near field communication (NFC) module, a Bluetooth transceiver, a cellular transceiver, a magnetometer, a gyroscope, an inertial sensor (e.g., a module the combines an accelerometer and a gyroscope), an ambient light sensor, a relative humidity sensor, or any other similar module operable to provide sensory output and/or receive sensory input. In some embodiments, one or more functions of the sensors 2062 may be implemented as hardware, software, or firmware. Further, as described herein, certain hardware modules such as the accelerometer, the GPS module, the gyroscope, the inertial sensor, or other such modules may be used in conjunction with the camera and image processing module to provide additional information. In certain embodiments, a user may use a user input module 2006 to select how to analyze the images.

Device 2000 may include a component such as a wireless communication module which may integrate antenna 2016 and wireless transceiver 2012 with any other hardware, firmware, or software necessary for wireless communications. Such a wireless communication module may be configured to receive signals from various devices such as data sources via networks and access points such as a network access point. In certain embodiments, compact object representations may be communicated to server computers, other mobile devices, or other networked computing devices to be stored in a remote database and used by multiple other devices when the devices execute object recognition functionality In addition to other hardware modules and applications in memory 2020, mobile device 2000 may have a display output 2003 and a user input module 2006. Display output 2003 graphically presents information from mobile device 2000 to the user. This information may be derived from one or more application modules, one or more hardware modules, a combination thereof, or any other suitable means for resolving graphical content for the user (e.g., by operating system 2023). Display output 2003 can be liquid crystal display (LCD) technology, light emitting polymer display (LPD) technology, or some other display technology. In some embodiments, display module 2003 is a capacitive or resistive touch screen and may be sensitive to haptic and/or tactile contact with a user. In such embodiments, the display output 2003 can comprise a multi-touch-sensitive display. Display output 2003 may then be used to display any number of outputs associated with a camera 2021 or image processing module 2022, such as alerts, settings, thresholds, user interfaces, or other such controls.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner.

Specific details are given in the description to provide a thorough understanding of the embodiments. However, embodiments may be practiced without certain specific details. For example, well-known circuits, processes, algorithms, structures, and techniques have been mentioned without unnecessary detail in order to avoid obscuring the embodiments. This description provides example embodiments only, and is not intended to limit the scope, applicability, or configuration of various embodiments. Rather, the preceding description of the embodiments will provide those skilled in the art with an enabling description for implementing embodiments. Various changes may be made in the function and arrangement of elements without departing from the spirit and scope of various embodiments.

Also, some embodiments were described as processes which may be depicted in a flow with process arrows. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks. Additionally, the above elements may merely be a component of a larger system, wherein other rules may take precedence over or otherwise modify the application of various embodiments, and any number of steps may be undertaken before, during, or after the elements of any embodiment are implemented.

It should be noted that the method as described herein may be implemented in software. The software may in general be stored in a non-transitory storage device (e.g., memory) and carried out by a processor (e.g., a general purpose processor, a digital signal processor, and the like.)

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Features described with respect to certain configurations may be combined in various other configurations. Different aspects and elements of the configurations may be combined in a similar manner. Many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for constructing a digital representation of a physical scene comprising:
    obtaining information about the physical scene containing at least a planar surface and one or more physical objects located on the planar surface;
    identifying the planar surface within the physical scene;
    determining an augmented reality (AR) plane corresponding to the planar surface wherein the AR plane comprises at least a portion of the planar surface and encircles at least one hole; wherein a size of the at least one hole is adjusted based on an occluded portion of the planar surface;
    determining one or more properties associated with a first object of the one or more physical objects located on the planar surface based at least in part on information about the at least one hole;
    generating a three-dimensional (3D) model using the properties associated with the first object and information associated with the AR plane; and generating a digital representation of an AR environment comprising the AR plane and the 3D model.

2. The method of claim 1, determining one or more properties associated with the first object is further based on identifying at least one or more feature points.

3. The method of claim 1, wherein the AR plane comprises a plurality of cells, each cell of the plurality of cells representing a region wherein a virtual object can navigate without collision with the first object.

4. The method of claim 1, wherein determining one or more properties associated with the first object comprises:
identifying one or more regions in the planar surface, wherein the one or more regions correspond to location of the first object on the planar surface; and
determining one or more external surfaces of the first object based on location of one or more convex regions and the one or more feature points.

5. The method of claim 1, wherein determining an AR plane corresponding to the planar surface comprises:
analyzing at least two images of the physical scene comprising the first object; and
based upon analysis of the at least two images of the physical scene, creating the AR plane such that the AR plane corresponds to the physical scene and excludes at least one region corresponding to the first object.

6. The method of claim 5, wherein analyzing the at least two images of the physical scene comprises:
capturing, using a camera, a first image of the physical scene at a first location, wherein the first image includes the first object;
determining a distance that the camera has moved from the first location to a second location;
capturing, using the camera, a second image of the physical scene at the second location, wherein the second image includes the first object; and
determining depth information for the first object using the first image and the second image.

7. The method of claim 1, wherein generating the 3D model comprises:
obtaining one or more feature points of the first object, wherein each feature point of the one or more feature points is indicative of a location, relative to the planar surface, of a point on an external surface of the first object;
estimating, using information associated with the AR plane and the one or more feature points, a shape of a portion of the first object that is not visible; and
constructing the 3D reconstructed object, based on the estimation.

8. The method of claim 7, wherein the estimation comprises at least one of:
a spline representation,
a reflected symmetrical object representation,
a planar representation, or
a curved representation.

9. The method of claim 1, wherein constructing the digital representation of the first object includes extruding object in a direction normal to the planar surface, based on a shape of a portion of the planar surface occluded by the first object.

10. The method of claim 1, wherein determining the AR plane corresponding to the planar surface comprises:
identifying an initial portion of the planar surface within the physical scene;
identifying additional portions of the planar surface, wherein each of the additional portions is identified as being a part of the planar surface based on determining a likeness between at least one visual or geometric property associated with the additional portions with at least one corresponding visual or geometric property associated with one or more portions already identified to be part of the planar surface.

11. The method of claim 10, wherein identifying the additional portions of the planar surface comprises:
establishing a model of a planar region within which the planar surface resides;
partitioning the planar region into a plurality of cells; and
evaluating each cell as a potential additional portion of the planar surface.

12. The method of claim 11, wherein evaluating each cell comprises iterating steps of:
for each cell identified as an additional portion of the planar surface, identifying neighboring cells not already identified as part of the planar surface; and
for each identified neighboring cell, evaluating the neighboring cell as a potential portion of the planar surface.

13. The method of claim 1, wherein the information about the physical scene is obtained by imaging the physical scene; and
the occluded portion of the planar surface is caused by imaging at least a portion of the first object and at least a portion of the planar surface.

14. The method of claim 1, wherein the 3D model is a 3D model of the first object.

15. The method of claim 1, wherein the one or more properties associated with the first object include one or more feature points of the first object.

16. The method of claim 15, wherein the one or more properties of the first object are one or more properties indicating a size or shape of the first object.

17. The method of claim 1, wherein the 3D object is generated without using information obtained from imaging the first object.

18. The method of claim 13, further comprising:
identifying a sub-portion of the occluded portion corresponding to a shadow projected by the first object;
wherein the size of the at least one hole is adjusted by removing the sub-portion from the occluded portion.

19. A device for constructing a digital representation of a physical scene, comprising:
a memory;
a camera for obtaining information about the physical scene; and
a processor coupled to the memory and configured to:
obtain information about the physical scene containing at least a planar surface and one or more physical objects located on the planar surface;
identify the planar surface within the physical scene;
determine an augmented reality (AR) plane corresponding to the planar surface wherein the AR plane comprises at least a portion of the planar surface and encircles at least one hole; wherein a size of the at least one hole is adjusted based on occluded portion of the planar surface;
determine one or more properties associated with a first object of the one or more physical objects located on the planar surface based at least in part on information about the at least one hole;
generate a three-dimensional (3D) model using the properties associated with the first object and information associated with the AR plane; and
generate a digital representation of an AR environment comprising the AR plane and the 3D model.

20. The device of claim 19, where in the processor is further configured to determine one or more properties associated with the first object is further based on identifying at least one or more feature points.

21. The device of claim 19, wherein the AR plane comprises a plurality of cells, each cell of the plurality of cells representing a region wherein a virtual object can navigate without collision with the first object.

22. The device of claim 19, wherein determining one or more properties associated with the first object comprises the processor further configured to:
identify one or more regions in the planar surface, wherein the one or more regions correspond to location of the first object on the planar surface; and
determine one or more external surfaces of the first object based on location of one or more convex regions and the one or more feature points.

23. The device of claim 19, wherein determining an AR plane corresponding to the planar surface comprises the processor further configured to:
analyze at least two images of the physical scene comprising the first object; and
based upon analysis of the at least two images of the physical scene, create the AR plane such that the AR plane corresponds to the physical scene and excludes at least one region corresponding to the first object.

24. The device of claim 23, wherein analyzing the at least two images of the physical scene comprises the processor further configured to:
capture, using a camera, a first image of the physical scene at a first location, wherein the first image includes the first object;
determine a distance that the camera has moved from the first location to a second location;
capture, using the camera, a second image of the physical scene at the second location, wherein the second image includes the first object; and
determine depth information for the first object using the first image and the second image.

25. The device of claim 19, wherein generating the 3D model comprises the processor further configured to:
obtain one or more feature points of the first object, wherein each feature point of the one or more feature points is indicative of a location, relative to the planar surface, of a point on an external surface of the first object;
estimate, using information associated with the planar surface and the one or more feature points, a shape of a portion of the first object that is not visible; and
construct the 3D reconstructed object, based on the estimation.

26. The device of claim 25, wherein the estimation comprises at least one of:
a spline representation,
a reflected symmetrical object representation,
a planar representation, or
a curved representation.

27. The device of claim 19, wherein constructing the digital representation of the first object includes the processor configured to extrude object in a direction normal to the planar surface, based on a shape of a portion of the planar surface occluded by the first object.

28. The device of claim 19, wherein determining the AR plane corresponding to the planar surface comprises the processor further configured to:
identify an initial portion of the planar surface within the physical scene;
identify additional portions of the planar surface, wherein each of the additional portions is identified as being a part of the planar surface based on determining a likeness between at least one visual or geometric property associated with the additional portions with at least one corresponding visual or geometric property associated with one or more portions already identified to be part of the planar surface.

29. The device of claim 28, wherein identifying the additional portions of the planar surface comprises the processor further configured to:
establish a model of a planar region within which the planar surface resides;
partition the planar region into a plurality of cells; and
evaluate each cell as a potential additional portion of the planar surface.

30. A non-transitory computer-readable storage medium, wherein the non-transitory computer-readable storage medium comprises instructions executable by a processor, the instructions comprising instructions to:
obtain information about the physical scene containing at least a planar surface and one or more physical objects located on the planar surface;
identify the planar surface within the physical scene;
determine an augmented reality (AR) plane corresponding to the planar surface wherein the AR plane comprises at least a portion of the planar surface and encircles at least one hole; wherein a size of the at least one hole is adjusted based on an occluded portion of the planar surface;
determine one or more properties associated with a first object of the one or more physical objects located on the planar surface based at least in part on information about the at least one hole;
generate a three-dimensional (3D) model using the properties associated with the first object and information associated with the AR plane; and
generate a digital representation of an AR environment comprising the AR plane and the 3D model.

31. An apparatus, comprising:
means for obtaining information about the physical scene containing at least a planar surface and one or more physical objects located on the planar surface;
means for identifying the planar surface within the physical scene;
means for determining an augmented reality (AR) plane corresponding to the planar surface wherein the AR plane comprises at least a portion of the planar surface and encircles at least one hole; wherein a size of the at least one hole is adjusted based on occluded portion of the planar surface;
means for determining one or more properties associated with a first object of the one or more physical objects located on the planar surface based at least in part on information about the at least one hole;
means for generating a three-dimensional (3D) model using the properties associated with the first object and information associated with the AR plane; and
means for generating a digital representation of an AR environment comprising the AR plane and the 3D model.

* * * * *